United States Patent
Cha

(10) Patent No.: US 10,491,257 B2
(45) Date of Patent: Nov. 26, 2019

(54) MOBILE TERMINAL INCLUDING A MOVABLE WATERPROOF UNIT

(71) Applicant: LG ELECTRONICS INC., Seoul (KR)

(72) Inventor: Youngdo Cha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/306,470

(22) PCT Filed: Jun. 29, 2016

(86) PCT No.: PCT/KR2016/006985
§ 371 (c)(1),
(2) Date: Nov. 30, 2018

(87) PCT Pub. No.: WO2017/209343
PCT Pub. Date: Dec. 7, 2017

(65) Prior Publication Data
US 2019/0173506 A1    Jun. 6, 2019

(30) Foreign Application Priority Data

Jun. 3, 2016 (KR) .................. 10-2016-0069396

(51) Int. Cl.
*H04B 1/3818*      (2015.01)
*H04M 1/02*        (2006.01)
(Continued)

(52) U.S. Cl.
CPC ......... *H04B 1/3818* (2015.01); *H04B 1/3833* (2013.01); *H04M 1/02* (2013.01); *H04M 1/18* (2013.01); *H04B 2001/3894* (2013.01)

(58) Field of Classification Search
CPC combination set(s) only.
See application file for complete search history.

(56) References Cited

U.S. PATENT DOCUMENTS 9,706,676 B2 *   7/2017   Moon ................. H04B 1/3816
10,082,834 B2 *  9/2018   Choi .................... G06F 1/1656
(Continued)

FOREIGN PATENT DOCUMENTS

KR          10-1489490 B1    2/2015
KR       10-2015-0053350 A    5/2015
(Continued)

*Primary Examiner* — Lisa Lea-Edmonds
(74) *Attorney, Agent, or Firm* — Birch, Stewart, Kolasch & Birch, LLP

(57) ABSTRACT

The mobile terminal is disclosed. The mobile terminal of the present invention may include a body having a body hole, a display unit, a waterproof unit, and a second guide unit. A part of the waterproof unit is movable in the body hole, and the waterproof unit may open and close the body hole. When the waterproof unit shields the body hole, liquid inflow from the outside to the inside may be suppressed through the body hole. The second guide part may guide a part of the waterproof unit to move in the direction of opening the body hole in the body hole. The waterproof unit may include a waterproof unit body moving inside the body hole, a guide connection part extending from the waterproof unit body, and a guide bending part extending from the guide connection part and curved. The guide bending part is guided away from the waterproof unit body, so that warpage of the waterproof unit may be prevented.

14 Claims, 23 Drawing Sheets

(51) Int. Cl.
*H04B 1/3827* (2015.01)
*H04M 1/18* (2006.01)
*H04B 1/38* (2015.01)

(56) References Cited

U.S. PATENT DOCUMENTS

| | | | |
|---|---|---|---|
| 10,165,096 B2* | 12/2018 | Cha | H04M 1/0249 |
| 10,310,562 B2* | 6/2019 | Choi | G06F 1/1656 |
| 2011/0090652 A1* | 4/2011 | Wee | H05K 5/069 |
| | | | 361/749 |
| 2012/0276765 A1 | 11/2012 | Nakase et al. | |
| 2013/0242481 A1* | 9/2013 | Kim | H05K 5/06 |
| | | | 361/679.01 |
| 2014/0167365 A1* | 6/2014 | Chu | F16J 15/025 |
| | | | 277/590 |
| 2015/0005042 A1* | 1/2015 | Lee | H04M 1/18 |
| | | | 455/572 |
| 2015/0155651 A1* | 6/2015 | Ejiri | H01R 13/5213 |
| | | | 439/521 |
| 2016/0113142 A1 | 4/2016 | Moon et al. | |
| 2019/0124782 A1* | 4/2019 | Nihei | H05K 5/03 |
| 2019/0150307 A1* | 5/2019 | Park | H04M 1/0249 |

FOREIGN PATENT DOCUMENTS

| | | | | |
|---|---|---|---|---|
| KR | 10-2016-0012859 A | 2/2016 | | |
| KR | 10-2016-0045284 A | 4/2016 | | |
| WO | WO-2017209343 A1 * | 12/2017 | | H04M 1/02 |

* cited by examiner

【Figure 1】
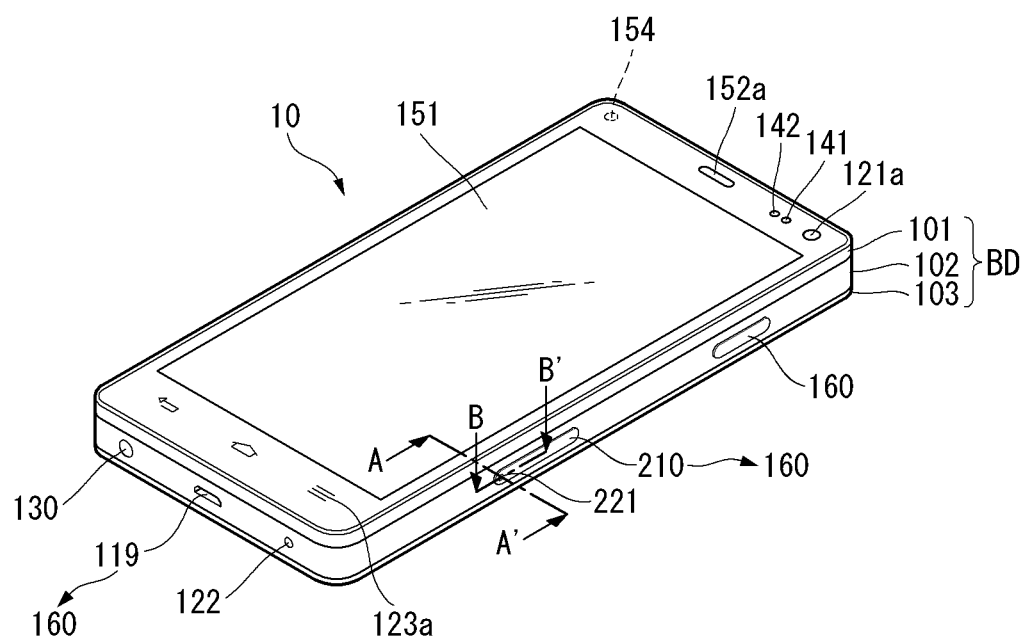

【Figure 2】
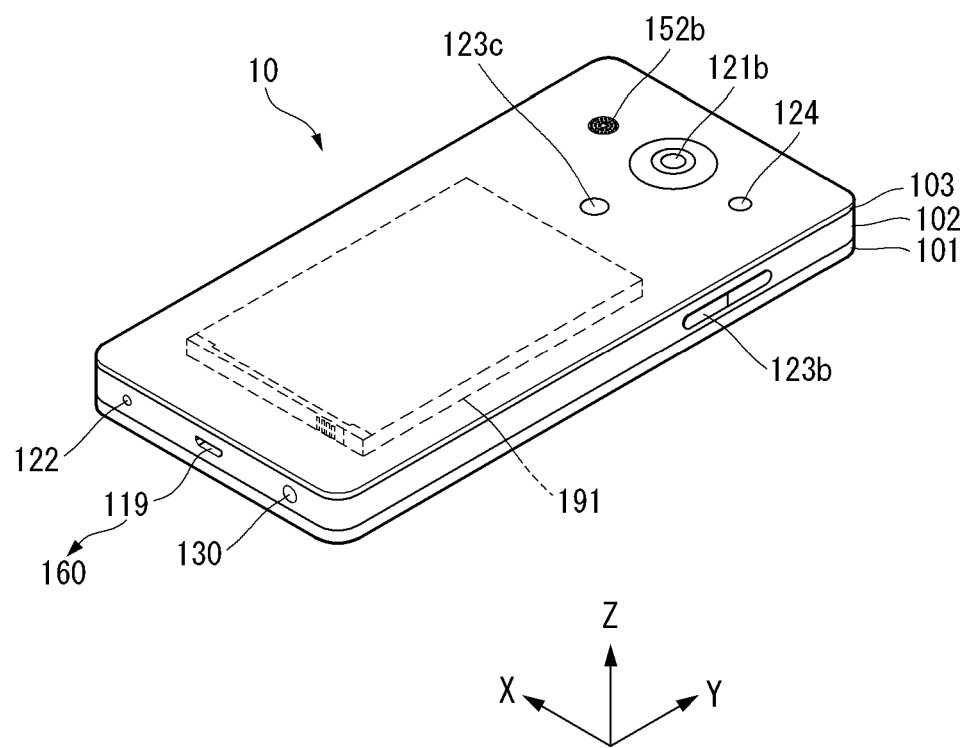

[Figure 3]
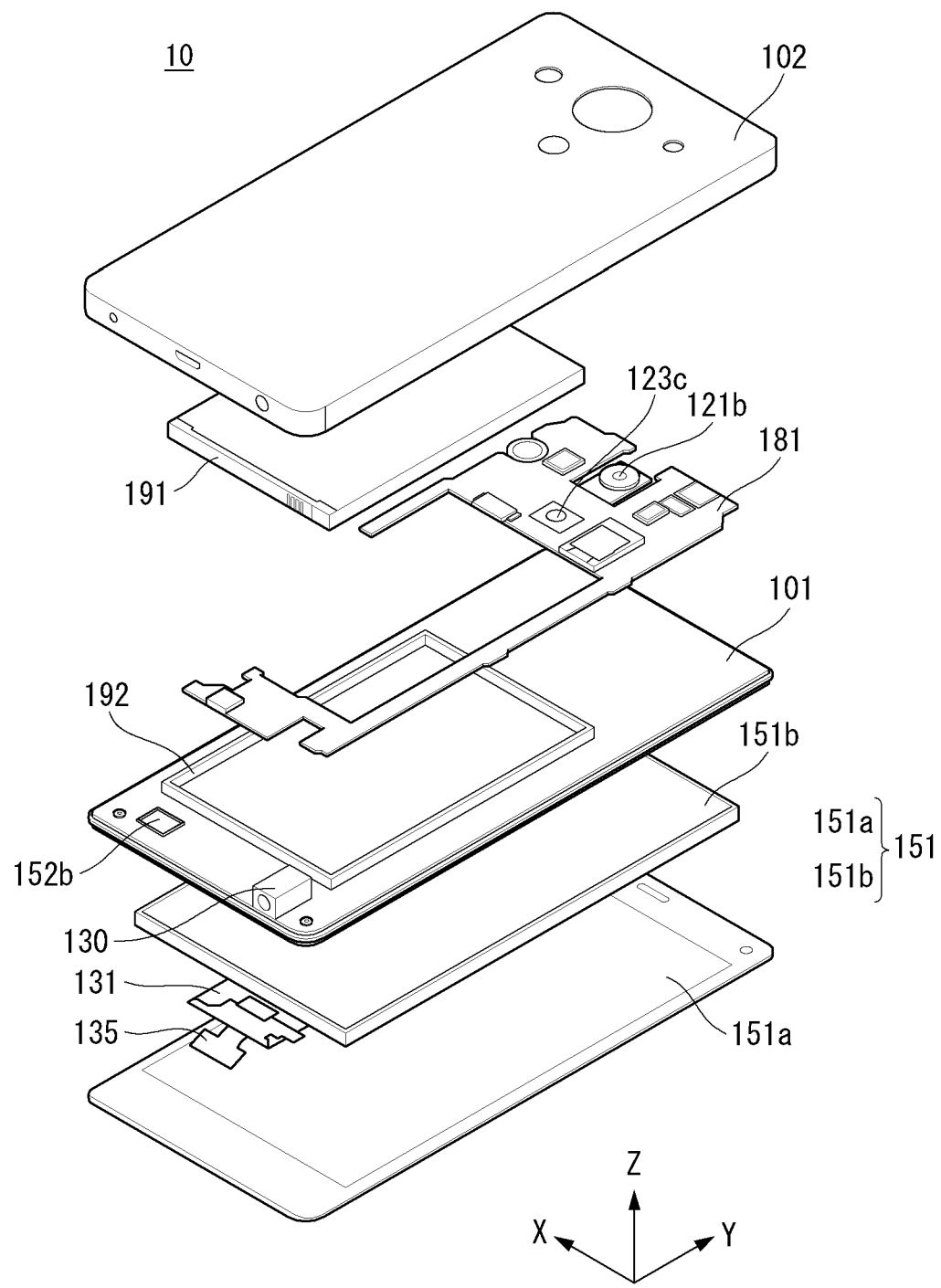

【Figure 4】
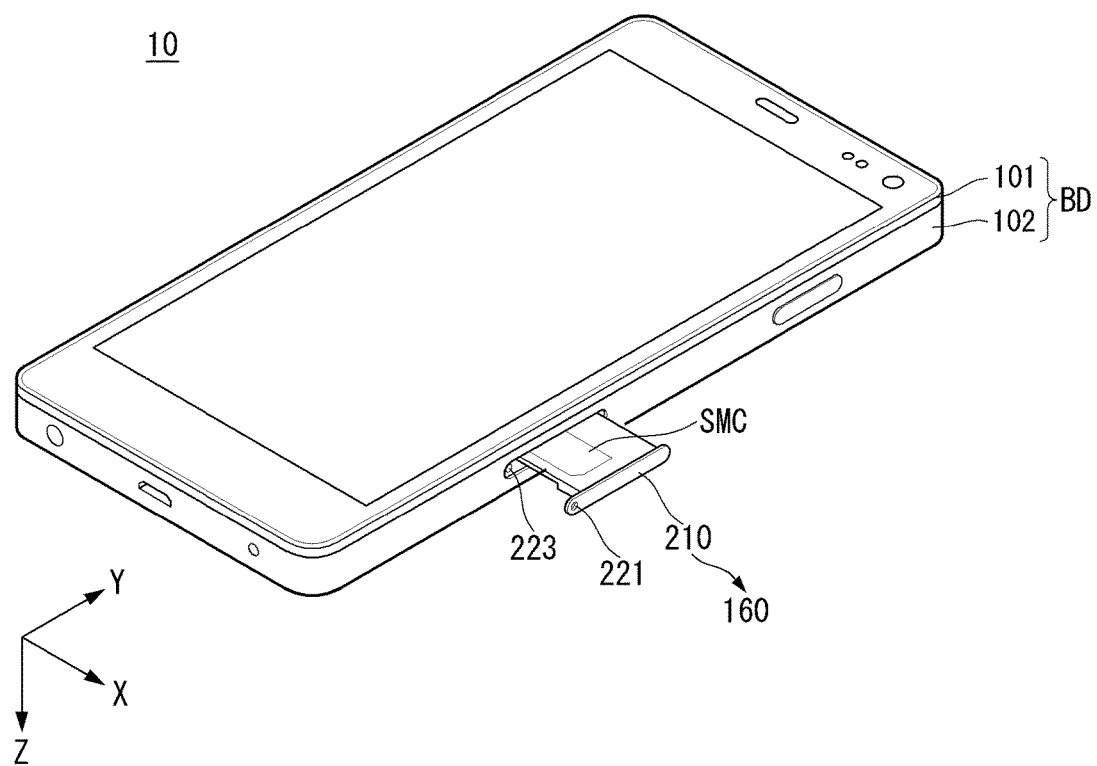

[Figure 5]
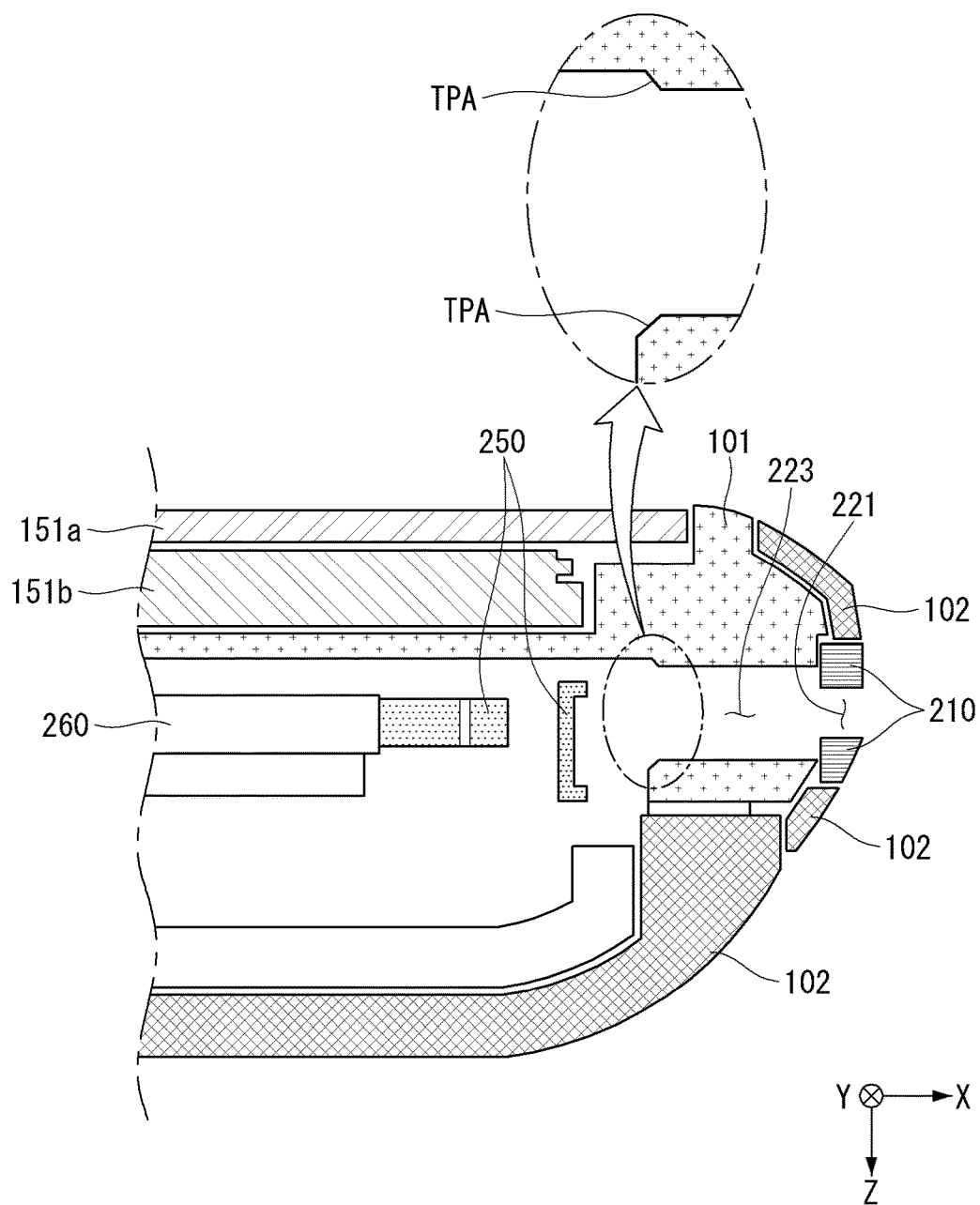

[Figure 6]
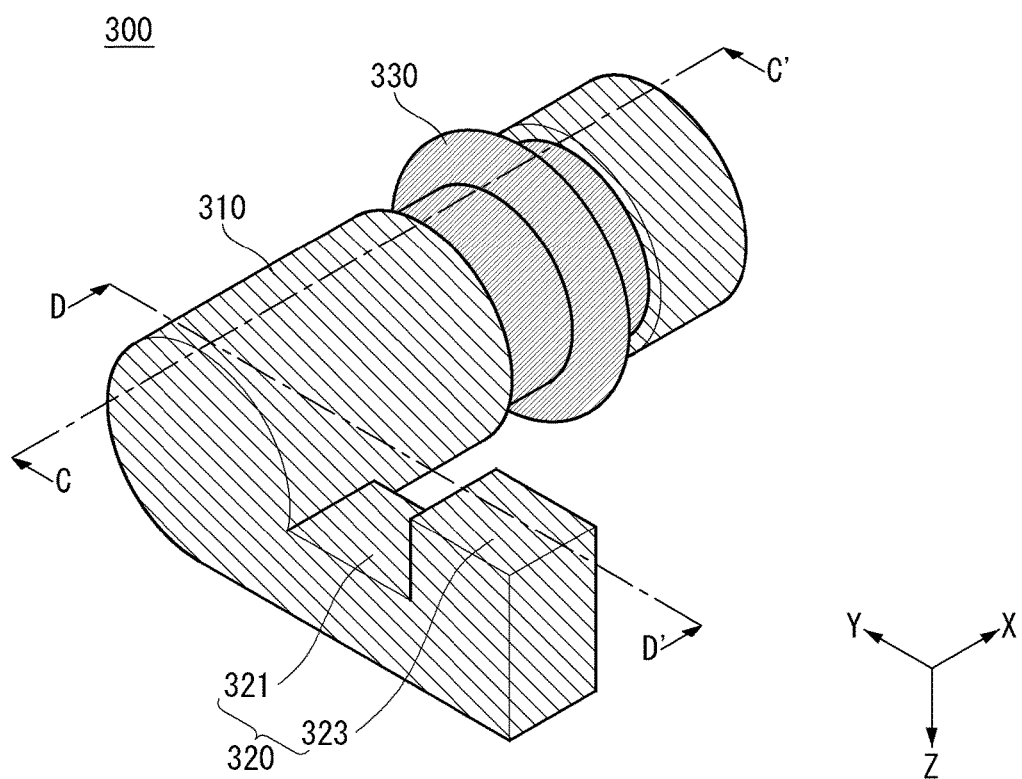

[Figure 7]
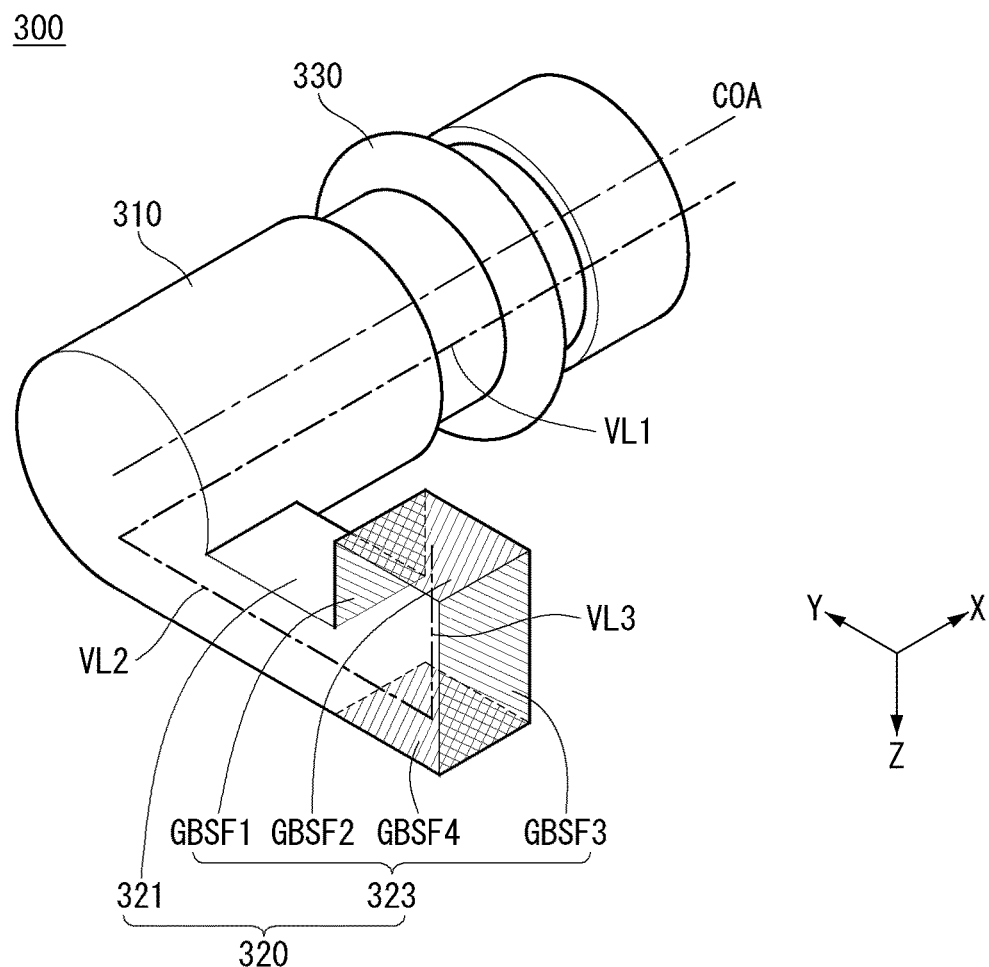

[Figure 8]
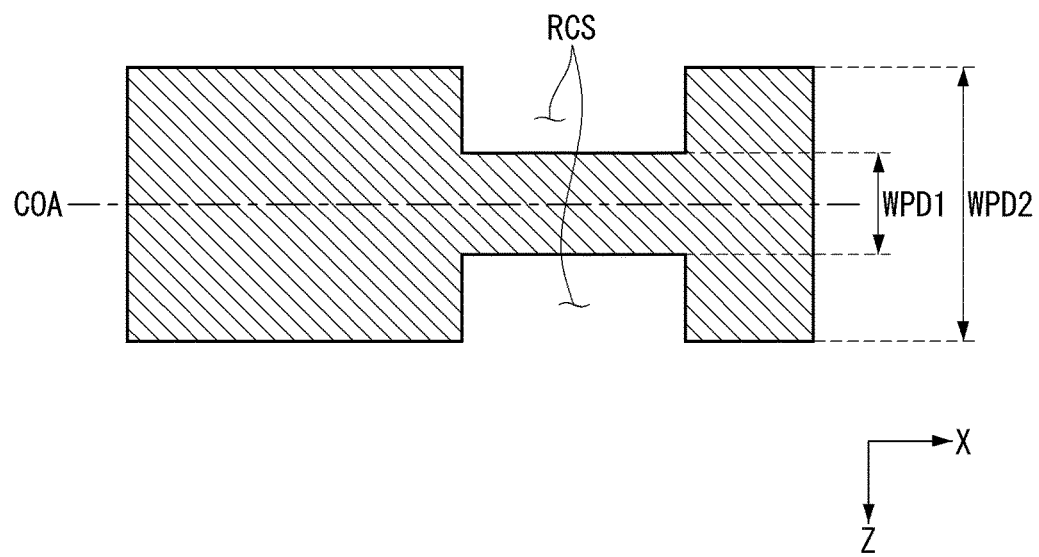

[Figure 9]
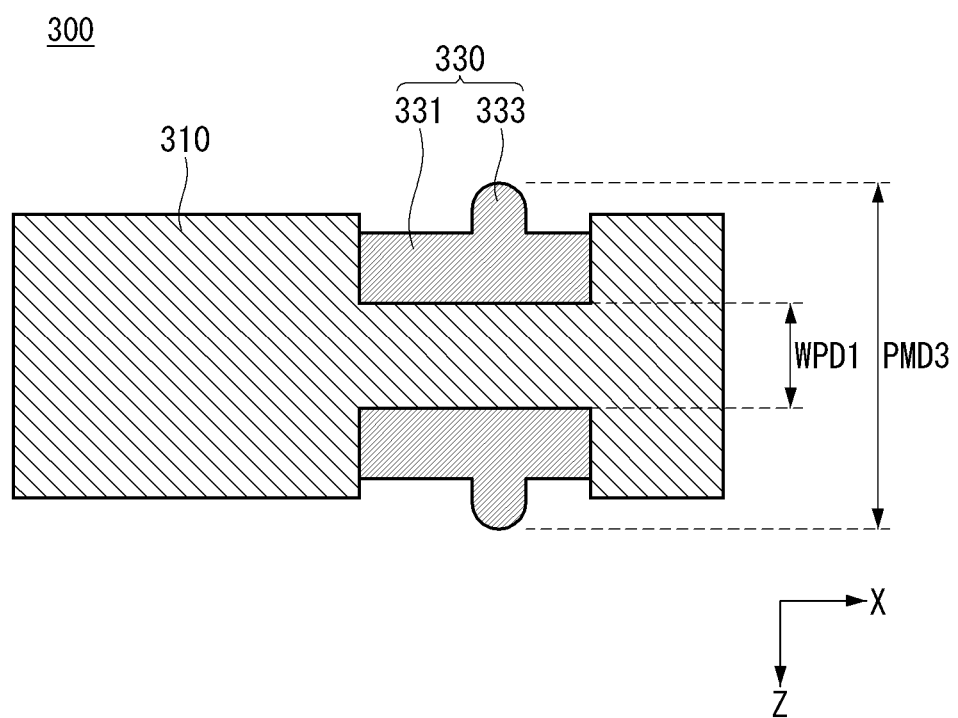

【Figure 10】
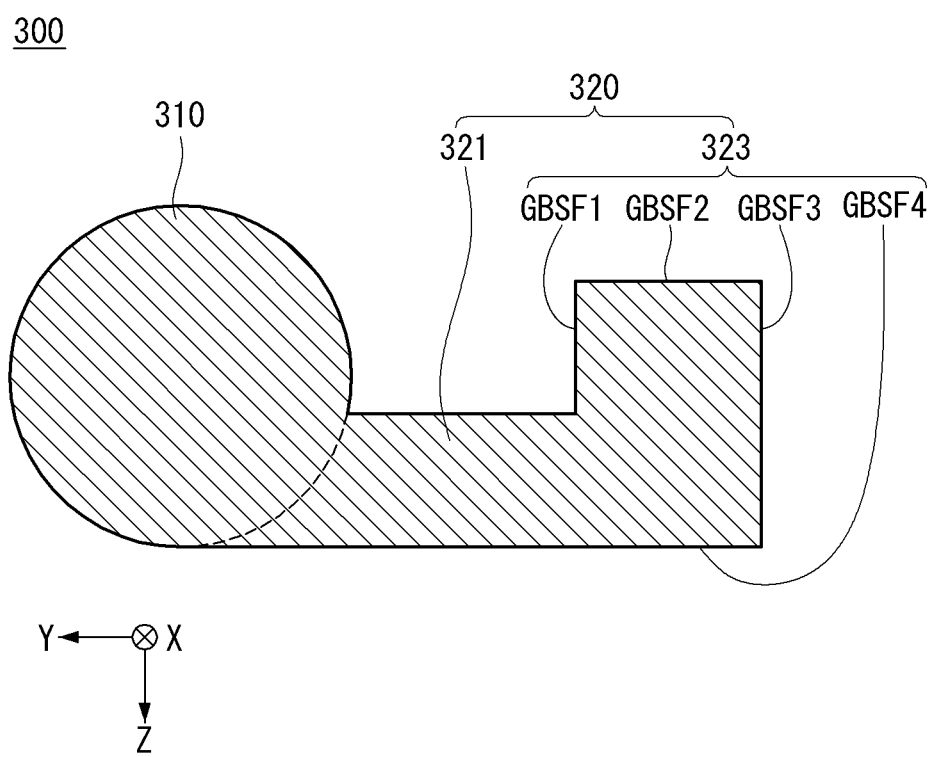

【Figure 11】
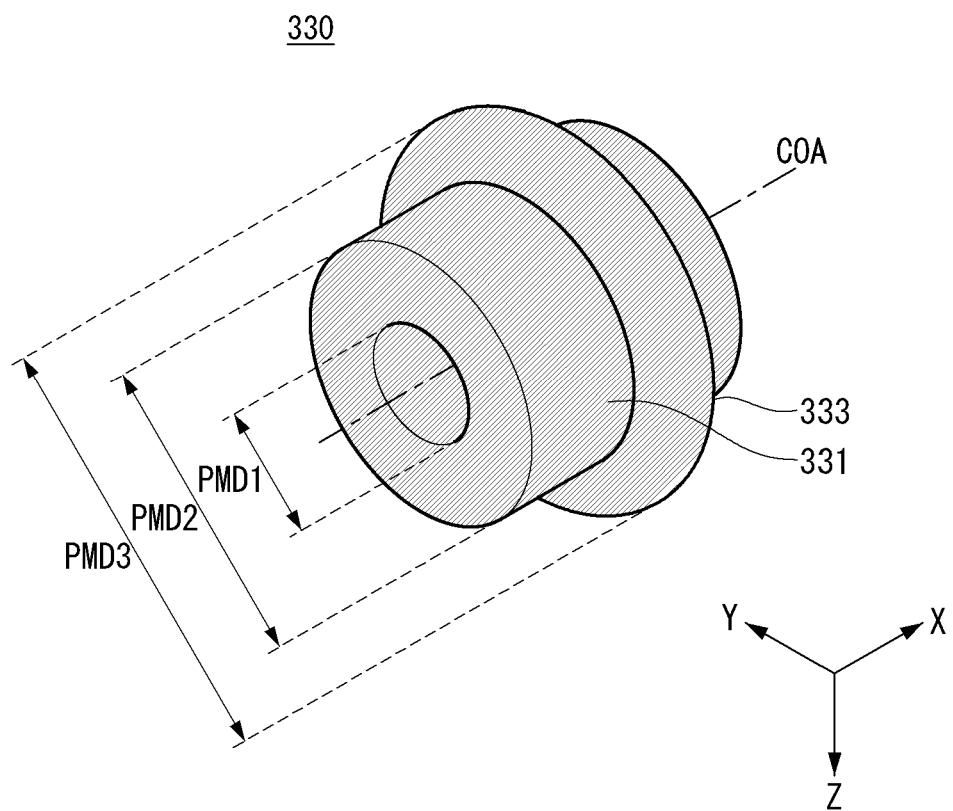

[Figure 12]
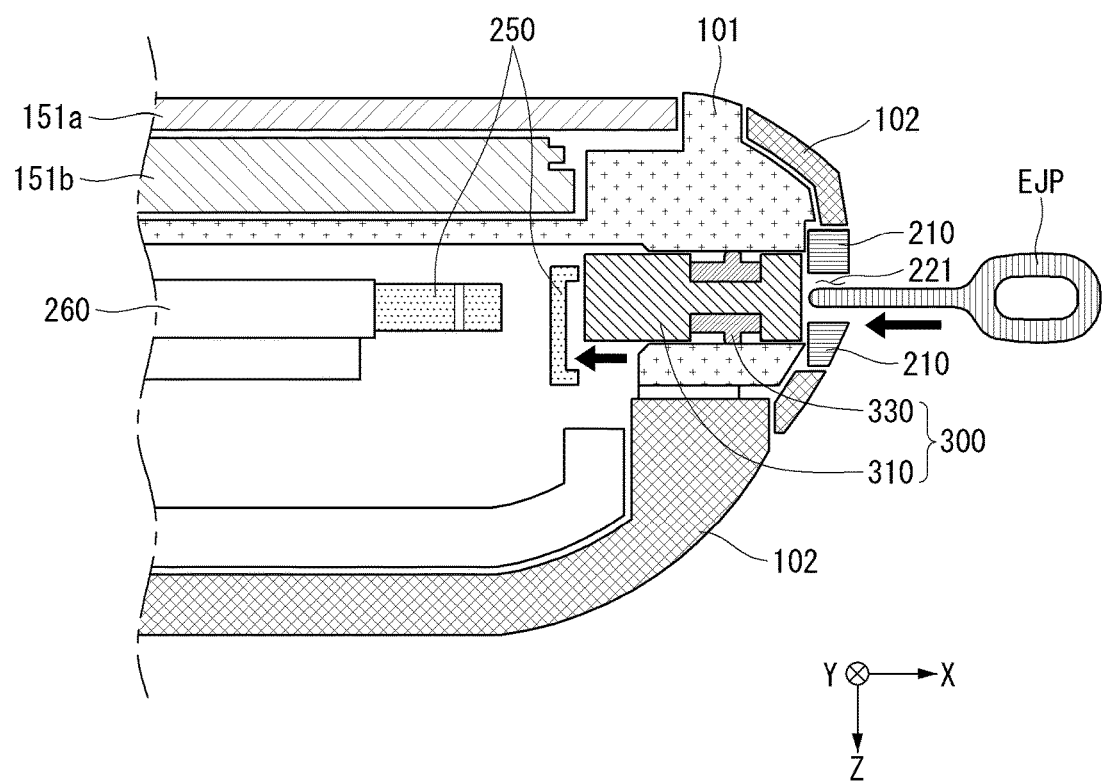

【Figure 13】
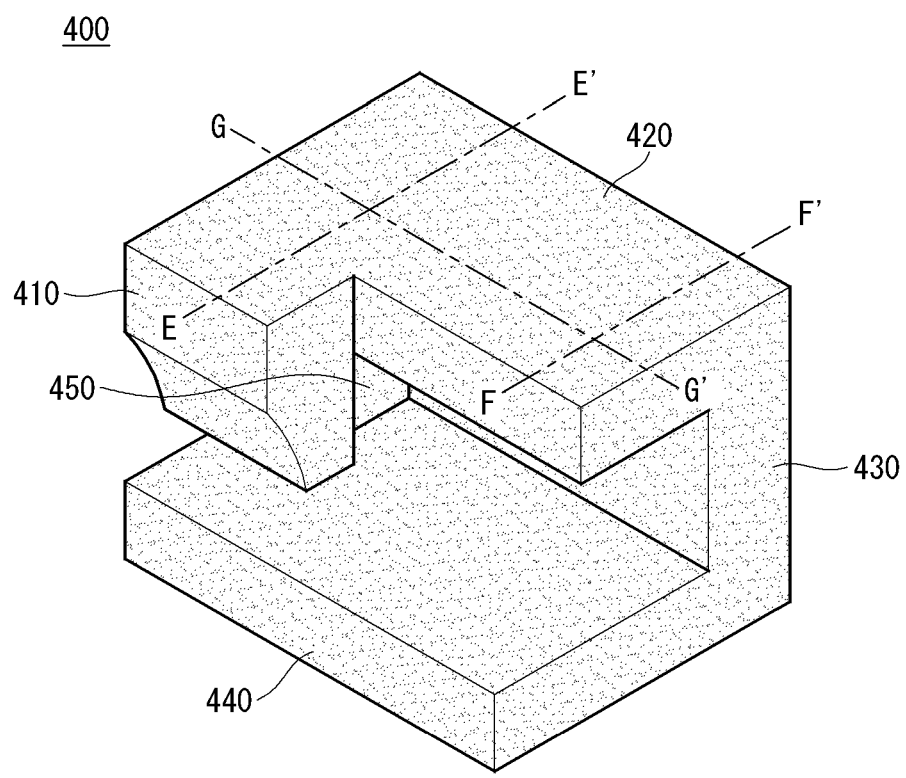

【Figure 14】
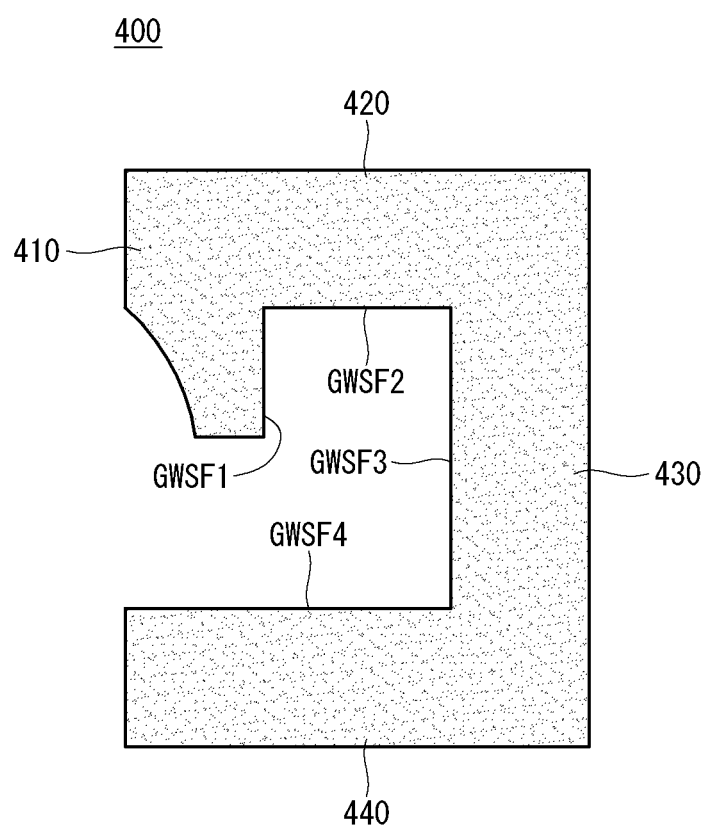

[Figure 15]
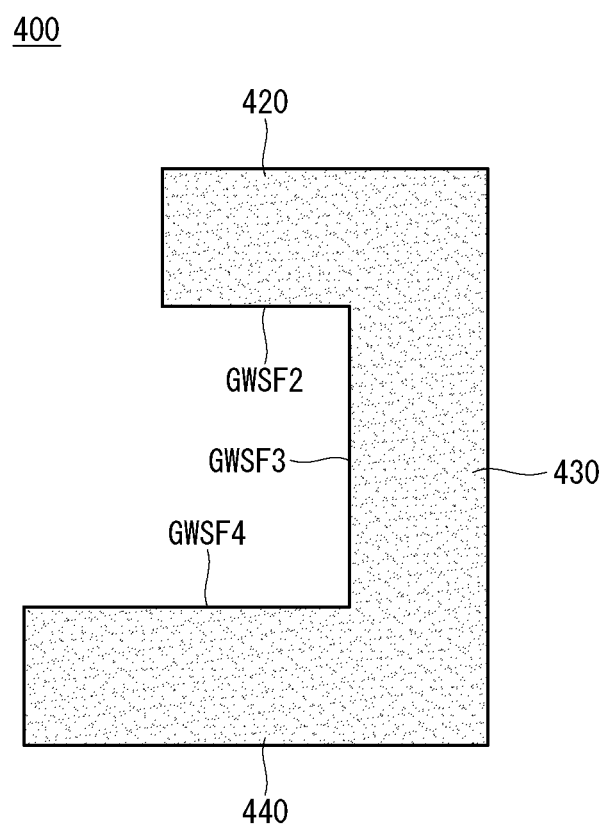

【Figure 16】
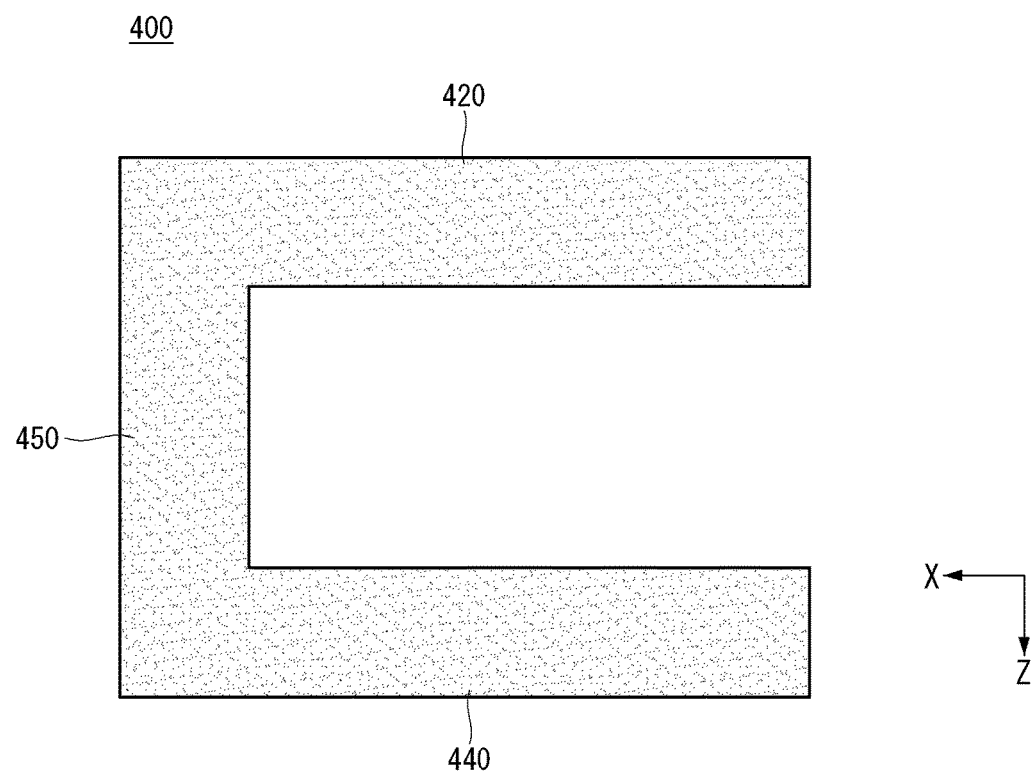

【Figure 17】
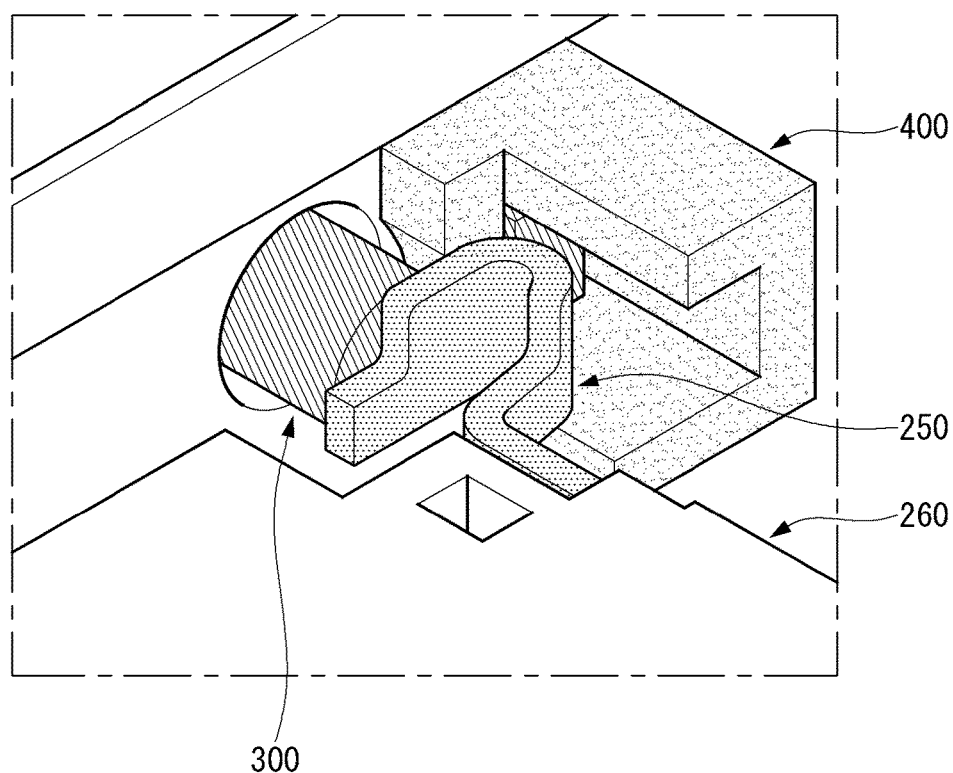

[Figure 18]
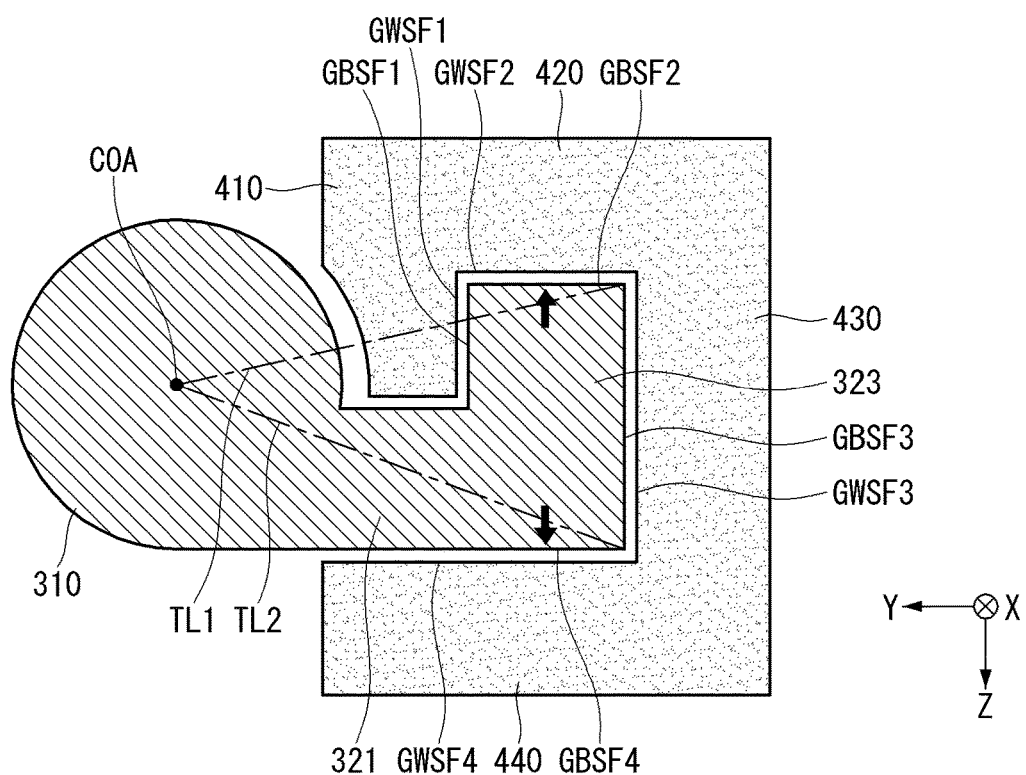

【Figure 19】
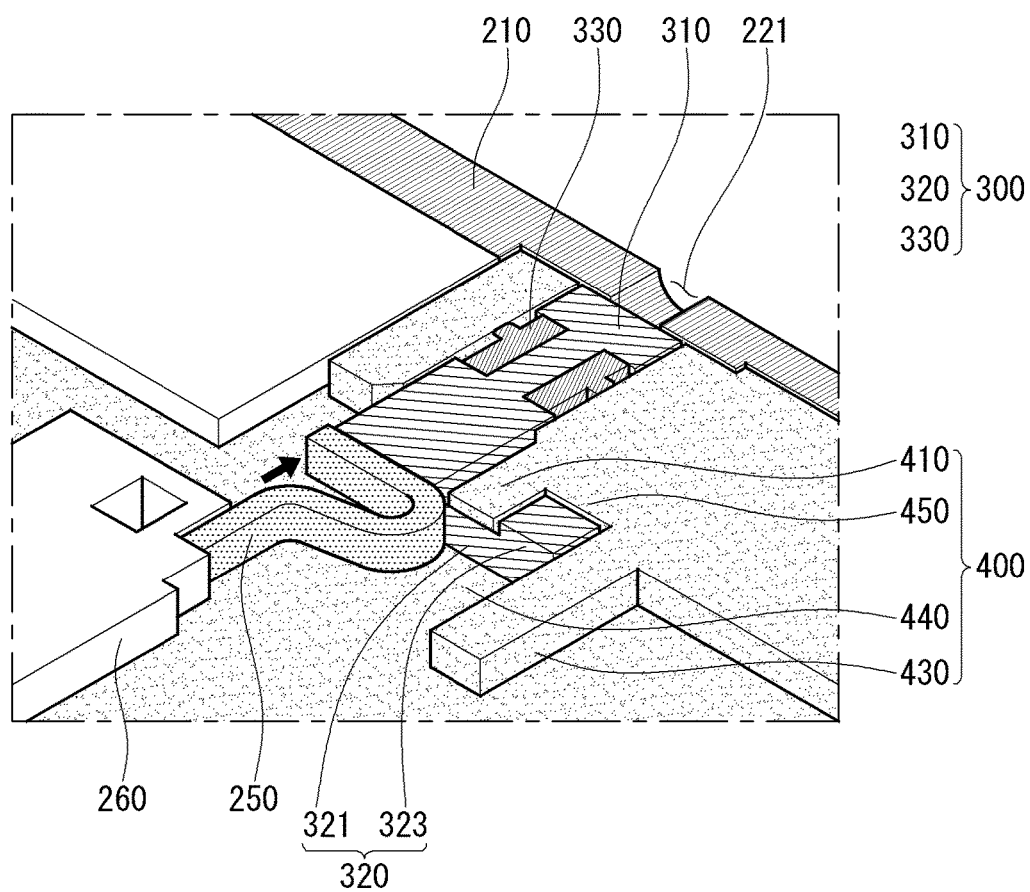

[Figure 20]
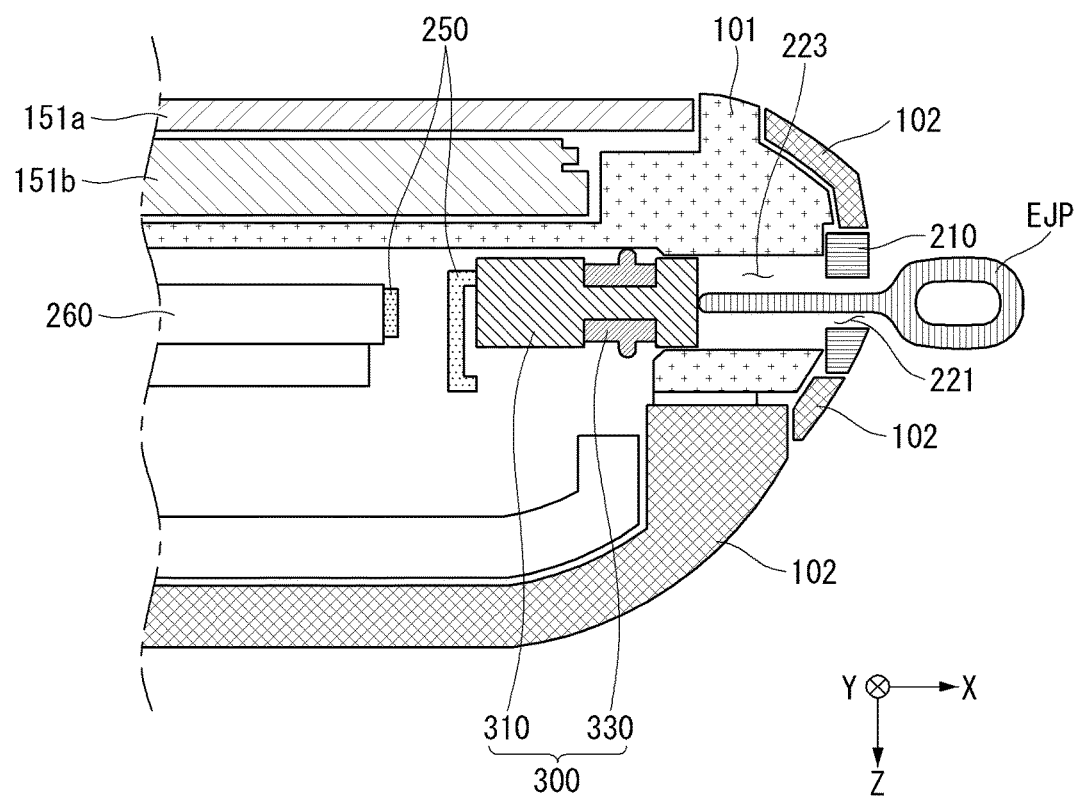

[Figure 21]
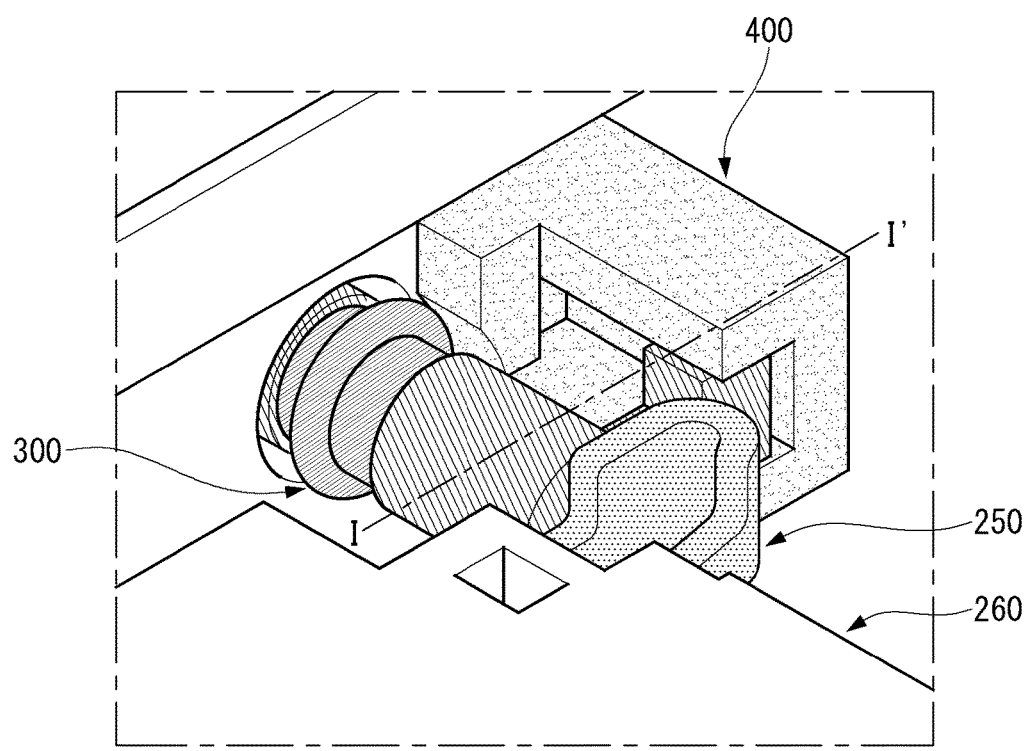

[Figure 22]
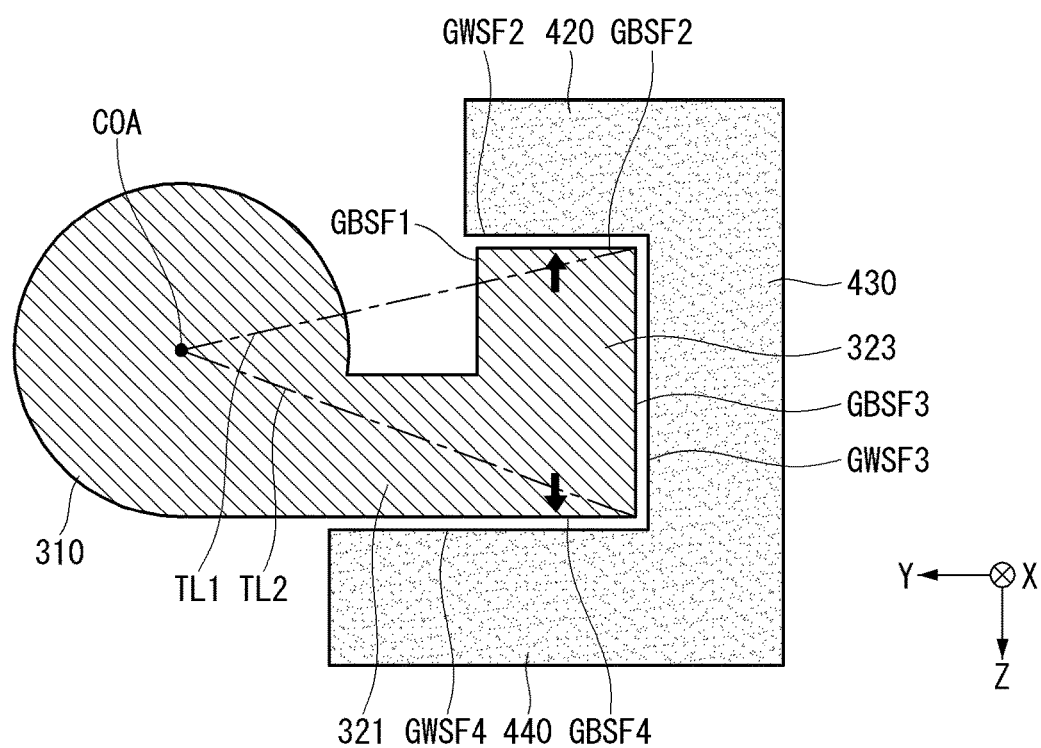

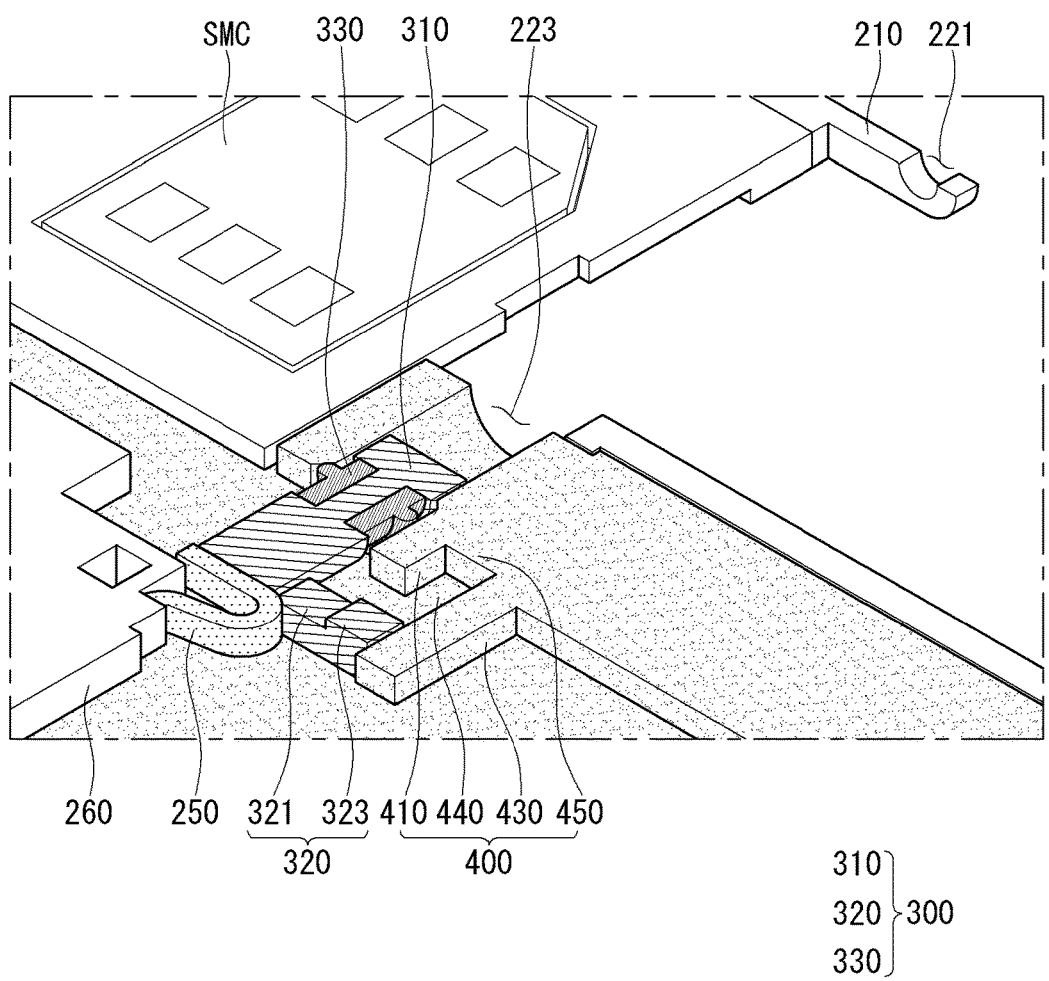
[Figure 23]

MOBILE TERMINAL INCLUDING A MOVABLE WATERPROOF UNIT

CROSS REFERENCE TO RELATED APPLICATIONS

This application is the National Phase of PCT International Application No. PCT/KR2016/006985, filed on Jun. 29, 2016, which claims priority under 35 U.S.C. 119(a) to Patent Application No. 10-2016-0069396, filed in Korea on Jun. 03, 2016, all of which are hereby expressly incorporated by reference into the present application.

TECHNICAL FIELD

More specifically, the present invention relates to a mobile terminal for sealing a hole used for input/output of a SIM tray.

BACKGROUND ART

A terminal may be categorized into a mobile/portable terminal or a stationary terminal depending on whether the terminal is movable. The mobile terminal may be categorized into a handheld terminal or a vehicle mounted terminal according to whether the user may carry the mobile phone directly.

The functions of mobile terminals have been diversified. For example, the functions of mobile terminals are: communication of data and voice, photographing and video shooting through a camera, voice recording, music file playback through a speaker system, and outputting an image or video to a display unit. Some mobile terminals are equipped with an electronic game play function or a multimedia player function. In particular, mobile terminals may receive multicast signals that provide visual content such as broadcast and video or television programs.

Such a terminal has been a multimedia player having a complex function such as photographing or video shooting, playback of music or video file.

For supporting and increasing the functionality of such terminals, it is contemplated to improve the structural and/or software aspects of the terminal.

DISCLOSURE

Technical Problem

The present invention is directed to solving the above-noted and other problems. Another object of the present invention is to provide a mobile terminal that may drain a hole used for input/output of SIM Tray

Technical Solution

According to an aspect of the present invention, a mobile terminal, comprising: a body having a body hole; a display unit disposed on a front surface of the body; a waterproof unit.

Wherein the waterproof unit includes, a waterproof unit body which is located inside the body and is movable, a first guide part connected to the waterproofing unit body, and a packing part connected to the waterproofing unit body, wherein the water proof unit shields the body hole at one point of the body hole by contacting the inside of the body hole with the packing part, a second guide part formed corresponding to the first guide part and spaced apart from the waterproof unit body to be installed inside the body and guiding the first guide part.

Wherein the first guide part may comprises, a guide connection part formed extending from the waterproof unit body; and a guide bending part formed extending from the guide connection part and bent at least partially by the second guide part.

Wherein the second guide part may comprise a plurality of guide walls facing the guide bending part.

Wherein the second guide part may comprise a stopper wall for inhibiting movement in one direction at one point of the first guide part.

Wherein the second guide part may include a first guide wall and a third guide wall separated apart from the first guide wall, wherein the guide bending part is guided and positioned between the first guide wall and the third guide wall at one point.

Wherein the first guide wall may form a first guide wall surface facing the guide bend part, wherein the third guide wall may form a third guide wall surface facing the guide bend part, wherein the first and third guide wall surfaces may be separated apart from the waterproof unit body 310.

Wherein the second guide part may include a second guide wall and a fourth guide wall located between the first guide wall and the third guide wall, wherein the guide bend part is guided and positioned between the second guide wall and the fourth guide wall at one point.

Wherein at least part of the waterproof unit body is movable in parallel with an opening direction of the body hole within the body hole.

Wherein the waterproof unit body may have a columnar shape and is recessed toward one side of the longitudinal direction of the waterproof unit body to form a concavity for seating the packing part.

Wherein the packing part may comprise a packing body located in the concave part and coupled to the waterproofing unit body.

Wherein the packing part may include a packing ring located on an outer circumferential surface of the waterproof unit body and in contact with an inner surface of the body hole when the waterproof unit body is located at one point of the body hole.

Wherein the mobile terminal may further comprise a force transmitting member located in the body and being provided with a force from the waterproof unit.

Wherein the force transmitting member may provide an elastic force to the waterproof unit.

Advantageous Effects

The advantages of the mobile terminal and the method for controlling the same according to the present invention will now be described.

According to at least one of the embodiments of the present invention, a waterproof effect of a hole formed in the mobile terminal may be expected. Further scope of applicability of the present invention will become apparent from the following detailed description.

It should be understood, however, that the detailed description and specific examples, such as the preferred embodiments of the invention, are given by way of illustration only, since various changes and modifications within the spirit and scope of the invention will be apparent to those skilled in the art.

DESCRIPTION OF DRAWINGS

FIGS. 1 and 2 are conceptual diagrams viewing a mobile terminal according to an embodiment of the present invention in different directions.

FIG. 3 is an exploded perspective view of the mobile terminal of FIG. 1.

FIG. 4 is a view illustrating a state in which the sim tray is pulled out of the mobile terminal shown in FIG. 1.

FIG. 5 is a cross-sectional view of the mobile terminal of FIG. 1 taken along line A-A'.

FIGS. 6 and 7 are views illustrating a waterproof unit according to an embodiment of the present invention.

FIGS. 8 and 9 are cross-sectional views of the waterproof unit of FIG. 6 taken along line C-C'.

FIG. 10 is a cross-sectional view of the waterproof unit of FIG. 6 taken along the line D-D'.

FIG. 11 is a view illustrating a packing part of the waterproof unit of FIG. 6.

FIG. 12 is a view illustrating a state in which a waterproof unit is included in the mobile terminal of FIG. 5.

FIGS. 13 to 16 are views illustrating a second guide unit according to an embodiment of the present invention.

FIG. 17 is a view illustrating a state where the second guide part is included in the mobile terminal of FIG. 12.

FIG. 18 is a cross-sectional view of the waterproof unit and the second guide part cut along the line H-H' in FIG. 17.

FIG. 19 is a cross-sectional view taken along line B-B' in a state where the waterproof unit and the second guide part are installed on the mobile terminal of FIG. 1.

FIG. 20 is a view illustrating a state in which the waterproof unit is moved in the mobile terminal of FIG. 12.

FIG. 21 is a view illustrating a state where the second guide part is included in the mobile terminal of FIG. 20.

FIG. 22 is a cross-sectional view of the waterproof unit and the second guide part taken along line I-I' of FIG. 21.

FIG. 23 is a view illustrating a state in which the SIM tray is discharged from the mobile terminal of FIG. 19.

MODE FOR INVENTION

Reference will now be made in detail embodiments of the invention examples of which are illustrated in the accompanying drawings. Since the present invention may be modified in various ways and may have various forms, specific embodiments are illustrated in the drawings and are described in detail in the present specification. However, it should be understood that the present invention are not limited to specific disclosed embodiments, but include all modifications, equivalents and substitutes included within the spirit and technical scope of the present invention.

The terms 'first', 'second', etc. may be used to describe various components, but the components are not limited by such terms. The terms are used only for the purpose of distinguishing one component from other components. For example, a first component may be designated as a second component without departing from the scope of the present invention. In the same manner, the second component may be designated as the first component.

The term "and/or" encompasses both combinations of the plurality of related items disclosed and any item from among the plurality of related items disclosed.

When an arbitrary component is described as "being connected to" or "being linked to" another component, this should be understood to mean that still another component (s) may exist between them, although the arbitrary component may be directly connected to, or linked to, the second component. In contrast, when an arbitrary component is described as "being directly connected to" or "being directly linked to" another component, this should be understood to mean that no component exists between them.

The terms used in the present application are used to describe only specific embodiments or examples, and are not intended to limit the present invention. A singular expression may include a plural expression as long as it does not have an apparently different meaning in context.

In the present application, the terms "include" and "have" should be understood to be intended to designate that illustrated features, numbers, steps, operations, components, parts or combinations thereof exist and not to preclude the existence of one or more different features, numbers, steps, operations, components, parts or combinations thereof, or the possibility of the addition thereof.

Unless otherwise specified, all of the terms which are used herein, including the technical or scientific terms, have the same meanings as those that are generally understood by a person having ordinary knowledge in the art to which the present invention pertains. The terms defined in a generally used dictionary must be understood to have meanings identical to those used in the context of a related art, and are not to be construed to have ideal or excessively formal meanings unless they are obviously specified in the present application.

The following exemplary embodiments of the present invention are provided to those skilled in the art in order to describe the present invention more completely. Accordingly, shapes and sizes of elements shown in the drawings may be exaggerated for clarity.

The mobile terminal described in this specification includes a mobile phone, a smart phone, a laptop computer, a digital broadcasting terminal, a personal digital assistant (PDA), a portable multimedia player (PMP), a slate PC, a tablet PC, an ultrabook, and a wearable device (such as a smartwatch, a smart glass, and a head mounted display (HMD)).

However, it could be understood by those skilled in the art that the configuration according to the embodiments described herein may be applied to fixed terminals such as a digital TV, a desktop computer, a digital signage, and the like.

The coordinate system used in the present specification is a Cartesian coordinate system as an orthogonal coordinate system. For example, the coordinate system used in this specification is an XYZ coordinate system. In this specification, the XYZ coordinate system is the left handed direction. In other words, when index finger to little finger of the left hand are wound from the X axis to the Y axis, the direction indicated by the thumb becomes the Z axis.

FIGS. 1 and 2 are conceptual diagrams viewing a mobile terminal according to an embodiment of the present invention in different directions.

Referring to FIGS. 1 and 2, the disclosed mobile terminal 10 includes a bar-shaped body. However, the present invention is not limited thereto, and may be applied to various structures such as a watch type, a clip type, or a glass type. The present invention may be applied various structures in which two or more bodies are movably coupled, such as a folder type, a flip type, a slide type, a swing type, and a swivel type. A description of a particular type of mobile terminal, although relevant to a particular type of mobile terminal, is generally applicable to other types of mobile terminals.

Here, the body of the terminal may be understood as a concept of referring to the mobile terminal 10 as at least one aggregate.

The mobile terminal 10 may include a case (for example, a frame, a housing, a cover, etc.) which forms an appearance. As shown, the mobile terminal 10 may include a front case 101 and a rear case 102. Various electronic components are disposed in the inner space formed by the front case 101 and the rear case 102. At least one middle case may be additionally disposed between the front case 101 and the rear case 102.

A display unit 151 may be disposed on a front surface of the terminal body to output information. The window 151*a* of the display unit 151 may be mounted on the front case 101 to form a front surface of the terminal body together with the front case 101.

In some cases, electronic components may also be mounted on the rear case 102. The electronic components that are available to be mounted on the rear case 102 include a detachable battery, an identification module, a memory card, and the like. In this case, a rear cover 103 for covering the mounted electronic component may be detachably coupled to the rear case 102. Therefore, when the rear cover 103 is separated from the rear case 102, the electronic components mounted on the rear case 102 may be exposed to the outside.

When the rear cover 103 is coupled to the rear case 102, a lateral part of the rear case 102 may be exposed. In some cases, the rear case 102 may be completely covered by the rear cover 103, when the rear case 102 and the rear cover 103 are coupled. Meanwhile, the rear cover 103 may be provided with an opening for exposing the camera 121*b* and the sound output unit 152*b*.

These cases 101, 102, and 103 may be formed by injection molding of synthetic resin or may be formed of metal such as stainless steel (STS), aluminum (Al), titanium (Ti), or the like.

The mobile terminal 10 may be configured such that one case provides the inner space, unlike the above example in which a plurality of cases provide an inner space for accommodating various electronic components. In this case, a mobile terminal 10 may have an unibody in which a synthetic resin or a metal is connected from the lateral to the rear.

Meanwhile, the mobile terminal 10 may include a waterproof unit (not shown) for preventing water from penetrating into the terminal body. For example, the waterproof unit may be provided with a waterproof member between the window 151*a* and the front case 101, between the front case 101 and the rear case 102, or between the rear case 102 and the rear cover 103. The waterproof member may seal an inner space formed between them.

The mobile terminal 10 may include the display unit 151, a first and a second audio output unit 152*a*, 152*b*, the proximity sensor 141, the illuminance sensor 142, the optical output unit 154, a first and a second cameras 121*a*, 121*b*, a first to a third manipulation units 123*a*, 123*b*, 123*c*, the microphone 122, the interface unit 160, and an earphone jack 130.

Hereinafter, as shown in FIGS. 1 and 2, on a front of the terminal body are disposed the display unit 151, the first audio output unit 152*a*, the proximity sensor 141, the illuminance sensor 142, the optical output unit 154, the first camera 121*a*, and the first manipulation unit 123*a*. On a lateral side of the body are disposed the second manipulation unit 123*b*, the microphone 122, the earphone jack 130, and the interface unit 160. On a rear side of the body are disposed the second audio output unit 152*b*, the third manipulation unit 123*c*, and the second camera 121*b*. The mobile terminal 10, which includes the front side of the body, the lateral side of the body, and the rear side of the body, may be described as an example.

However, these configurations are not limited to this arrangement. These configurations may be excluded or replaced, or disposed on the other side as needed. For example, the front side of the body may not be provided with the first manipulation unit 123*a*, and the second audio output unit 152*b* may be provided on not the rear side of the body but the lateral side of the body.

The body BD of the mobile terminal 10 may include a front case 101, a rear case 102 and a rear cover 103. The rear cover 103 may be integrally formed with the rear case 102. The body BD of the mobile terminal 10 may include a front case 101 and a rear case 102.

The display unit 151 displays (or outputs) information processed by the mobile terminal 10. For example, the display unit 151 may display execution screen information of an application program driven by the mobile terminal 10, or UI (User Interface) and GUI (Graphic User Interface) information according to the execution screen information.

The display unit 151 may include at least one of a liquid crystal display (LCD), a thin film transistor-liquid crystal display (TFT LCD), an organic light-emitting diode (OLED), a flexible display, and a 3D display, an e-ink display.

Further, the display unit 151 may be provided two or more depending on the implementation of the mobile terminal 10. In this case, a plurality of display unit may be spaced apart to one surface or may be disposed integrally, may also be disposed on different surfaces respectively in the mobile terminal 10.

The display unit 151 may include a touch sensor for sensing a touch on the display unit 151 to receive a control command. By using this, when a touch is applied to the display unit 151, the touch sensor senses the touch and a controller may generate a control command corresponding to the touch. Information that is input by the touch may be either a letter or a number, and it may be a specified or indicated menu items in the various modes. The controller may be implemented by some electronic components installed in the body BD. For example, the controller may be implemented by some electronic substrates or boards.

Meanwhile, the touch sensor may be configured as a film type having a touch pattern, and may be arranged between a window of the display unit 151 and a display panel on a rear side of the window of the display unit 151, or may be a metal wire patterned directly on the rear surface of the window of the display unit 151. Alternatively, the touch sensor may be formed integrally with the display unit 151. For example, the touch sensor may be disposed on a substrate of the display unit 151, or may be provided in an interior of the display unit 151.

Like this, the display unit 151 may form a touch screen with the touch sensor. In this case, the touch screen may work as the manipulation unit 123*a*. In some cases, the touch screen may replace at least some functions of the first manipulation unit 123*a*.

The first audio output unit 152*a* may be implemented as a receiver for transmitting the other party's voice to an ear of the user. The second audio output unit 152*b* may be implemented as a loud speaker for outputting various kinds of alarm sounds or playing sounds of multimedia.

The window of the display unit 151 may form a sound hole for the release of a sound generated from the first audio output unit 152*a*. However, the present invention is not limited to this. The sound may be released along an assembly gap between structures (for example, a gap between the window of the display unit 151 and the front case 101). In this case, since holes formed independently for sound output are apparently invisible or hidden, the external appearance of the mobile terminal 10 may become much simpler.

The optical output unit 154 may output a light to inform an user of an event occurred. The events may be a message reception, a call signal reception, a missed call, an alarm, event notification, e-mail reception, or an information reception via an application. If the user's confirmation of the event is detected, the controller may control the optical output unit 154 to be terminated.

The first camera 121*a* may include an image sensor for acquiring an image. The first camera 121*a* may process an image frame of a still image or a moving image obtained by the image sensor in the photographing mode or the video communication mode. The processed image frame may be displayed on the display unit 151 and may be stored in the memory.

The first to third manipulation units 123*a*, 123*b*, 123*c* may be operated to receive commands for controlling the operation of the mobile terminal 10, and may be collectively referred to as manipulating part. The first to third manipulation units 123*a*, 123*b*, and 123*c* may be adopted in any way if the way is touch, push, scroll, etc. as tactile manner that is operated while the user is receiving a tactile feel. Further, the first and second manipulation units 123*a*, 123*b* may be adopted also in such a way that is operated without the tactile feel of the user through proximity touch and hovering touch, etc. The third manipulation unit 123*c* may obtain the user's fingerprints with a fingerprint sensor. The obtained fingerprint information may be provided to the controller.

The first manipulation unit 123*a* may be a touch key as an example, but the present invention is not limited to this. For example, the first manipulation unit 123*a* may be a mechanical key, or may be composed of a combination of the touch key and the mechanical key.

The information that is input by the first and second manipulation units 123*a*, 123*b* may be variously set. For example, the first manipulation unit 123*a* may receive commands on menu, home key, maycel, search, etc. The second manipulation unit 123*b* may receive input commands, such as adjusting volume level of sound outputted from the first or the second audio output unit 152*a*, 152*b*, and switching to a touch recognition mode of the display unit 151.

Meanwhile, the rear surface of the terminal body may be provided with the third manipulation unit 123*c* as another example of the user input unit 123. The third manipulation unit 123*c* is to be manipulated in order to receive a command for controlling an operation of the mobile terminal 10, and information to be input may be variously set. For example, the third manipulation unit 123*c* may receive input commands, such as on/off of the power supply, start, end, scroll, etc., adjusting volume level of sound outputted from the first or the second audio output unit 152*a*, 152*b*, switching to a touch recognition mode of the display unit 151, and acquisition of fingerprint information. A rear input unit may be implemented in the form of a touch input and a push input, or in the form of a combination thereof.

The rear input unit may be disposed to be overlapped with the display unit 151 of the front surface in a thickness direction of the terminal body. For example, the rear input unit may be disposed on the rear upper end of the terminal body so as to be easily manipulated using an index finger when the user squeezes the terminal body with one hand. However, the present invention is not limited to this, and the location of the rear input unit may be changed.

In case the rear input unit is provided on the rear surface of the terminal body, a new type of user interface may be implemented using this. In addition, in case the first manipulation unit 123*a* is not disposed on the front surface of the terminal body by replacing at least some functions of the first manipulation unit 123*a* which is provided on the front surface of the terminal body with the previously described touch screen or the rear input unit, the display unit 151 may be configured in a more large screen.

Meanwhile, the mobile terminal 10 may be provided with a fingerprint recognition sensor to recognize fingerprints of the user, and the controller 180 may use the fingerprint information detected by the fingerprint recognition sensor as an authentication means. The fingerprint recognition sensor may be embedded in the display unit 151 or the user input unit 123.

The microphone 122 may be made to be provided with a user's voice, other sound and so on. The microphone 122 may be provided in a plurality of locations and may be configured to get a stereo sound.

The interface unit 160 may be a passage that may connect the mobile terminal 10 to an external device. For example, the interface unit 160 may be at least one of connection terminals for connection to another device (for example, an earphone, an external speaker), ports for short-range communication [for example, an infrared port (IrDA Port), a Bluetooth port, a wireless LAN Port, etc.], or power supply terminals for supplying power to the mobile terminal 10.

The interface unit 160 may be implemented as a socket for receiving an external card such as a SIM (Subscriber Identification Module) or a UIM (User Identity Module) or a memory card for storing information. For example, as shown in FIG. 1, the interface unit 160 may include a SIM tray 210 and an input-output port 119. The SIM tray 210 may load a SIM card. The SIM tray 210 may be moved to the inside or outside of the mobile terminal 10 for replacement and/or replacement of a SIM card. The input-output port 119 may be a path for electric power to be provided to the mobile terminal 10. The input-output port 119 may be connected to an external terminal or an external electronic device, and may be an input-output path for information and electric signals. The inputoutput port 119 may be connected to an external terminal. For example, the input-output port 119 may be connected to an external USB terminal. In this case, the input-output port 119 may be referred to as a USB port 119.

The second camera 121*b* may be disposed on the rear surface of the terminal body. In this case, the second camera 121*b* may shoot in opposite direction in comparison with the first camera 121*a*.

The second camera 121*b* may include a plurality of lenses that are arranged along at least one line. The plurality of lenses may be arranged in matrix form. These cameras may be referred to as 'array camera'. When the second camera 121*b* is configured by an array camera, it is possible to take images in a variety of ways using the plurality of lenses, and to obtain a better quality image.

A flash 124 may be disposed adjacent to the second camera 121*b*. The flash 124 may illuminate light toward an object when the second camera 121*b* is for shooting the object.

The second audio output unit 152*b* may be additionally disposed in the body BD. The second audio output unit 152*b* may implement a stereo function together with the first audio output unit 152a, and may be used for the implementation of a speakerphone mode during a call.

The body BD may be provided with at least one antenna for a wireless communication. The antenna may be embedded in the body BD or may be formed on the body BD. For example, an antenna that is part of a broadcast receiving module, may be configured to be drawn out from the body BD. Alternatively, the antenna may be formed in a film type and may be attached to an inner surface of the rear cover 103. A case comprising a conductive material may work as an antenna.

The body BD may be provided with a power supply unit on purpose of supplying an electric power to the mobile terminal 10. The power supply unit may be embedded in the body BD or may include a battery 191 which is detachable.

The battery 191 may be configured to be provided with the electric power via power cable connected to the interface unit 160. Further, the battery 191 may be configured to be charged by using wireless-charger. The wireless charging may be implemented by magnetic induction or resonance manner (magnetic resonance scheme).

Meanwhile, referring to the FIGS. 1 and 2, the rear cover 103 may be coupled to the rear case 102 to cover the battery 191 and may prevent separation of the battery 191 and may protect the battery 191 from an external impact and foreign matter. When the battery 191 is configured to be detachable on the terminal body, the rear cover 103 may be detachably coupled to the rear case 102.

An accessory to protect an appearance of the mobile terminal 10 or to assist or extend a function of the mobile terminal 10 may be added to the mobile terminal 10. An example of the accessory may be a cover to cover at least one surface of the mobile terminal 10 or a pouch to accommodate at least one surface of the mobile terminal 10. The cover or the pouch may be configured to extend the function of the mobile terminal 10 by interacting with the display unit 151. Another example of the accessory may be a touch pen to assist or extend a touch input on the touch screen.

FIG. 3 is an exploded perspective view of the mobile terminal of FIG. 1. The rear case 102 of the mobile terminal 10 may be integrally formed with the rear cover 103 (see FIG. 1). When the rear case 102 is integrally formed with the rear cover 103 (see FIG. 1), at least a part of the rear case 102 may be easily made of metal. When the rear case 102 is integrally formed with the rear cover 103 (see FIG. 1), it may be advantageous in securing the rigidity of the rear case 102.

The front case 101 may be fastened to the rear case 102. Electronic components may be disposed between the front case 101 and the rear case 102. When the front case 101 is fastened to the rear case 102, the electronic parts located inside the mobile terminal 10 may not be exposed to the outside. A battery 191, a main circuit board 181, an acoustic output unit 152c, and an earphone jack 130 may be disposed on the rear surface of the front case 101. A third manipulation unit 123c capable of obtaining fingerprint information may be connected to the main circuit board 181.

The rear case 102 may provide a space in which the electronic components may be seated. The rear case 102 may form at least a part of the rear surface of the mobile terminal 10. The rear case 102 may form at least a part of the lateral surface of the mobile terminal 10.

The display unit 151 may include a window 151a and a display panel 151b. A touch circuit board 135 and a display circuit board 131 may be connected to the display panel 151b. The display unit 151 may be accommodated in the front case 101. The touch circuit board 135 and the display circuit board 131 may be connected to the main circuit board 181. The battery accommodating part 192 may be formed on the rear surface of the front case 101 and receive the battery 191.

FIG. 4 is a view illustrating a state in which the SIM tray is pulled out of the mobile terminal shown in FIG. 1. An eject pin (not shown) may be inserted into the SIM tray hole 221 shown in FIG. An eject pin inserted into the SIM tray hole 221 may be inserted into the body hole 223 formed in the body BD.

An eject pin inserted into the body hole 223 formed in the body BD may apply a force to a housing on which the SIM tray 210 is placed. The housing may discharge the SIM tray 210 to the outside of the mobile terminal 10 by the force applied by the eject pin.

The SIM tray 210 may mount an IC chip or the like. The SIM tray 210 may, for example, be loaded with a SIM card (SMC). The SIM card SMC may include information of a user of the mobile terminal 10 and the like. The SIM card SMC may be replaceable in the SIM tray 210.

The body hole 223 formed in the body BD may pass an eject pin. The liquid may be introduced into the mobile terminal 10 from the outside of the mobile terminal 10 through the body hole 223 formed in the body BD. The liquid that may be introduced into the mobile terminal 10 may include, for example, water. A waterproof function of the body hole 223 formed in the body BD may be required for waterproofing the mobile terminal 10.

FIG. 5 is a cross-sectional view of the mobile terminal of FIG. 1 taken along line A-A'. A-A', which serves as a reference for the cross section, passes through the SIM hole 221 and may be aligned with the moving direction of the SIM tray 210. FIG. 5 is a cross section taken along the front surface to the rear surface of the mobile terminal.

The body hole 223 may be formed on one side of the body BD. The body hole 223 may be formed on one side of the front case 101, for example. The body hole 223 may communicate with the SIM hole 221. One end of the body hole 223 faces the card tray hole 221 and the other end of the body hole 223 faces the inside of the mobile terminal 10.

The SIM housing 260 may be located inside the body BD. The SIM housing (260) may seat the SIM tray (210). The SIM housing (260) may load the SIM tray (210). The SIM housing (260) may provide a space for the SIM tray (210) to move in and out of the mobile terminal (10).

The force transmitting member 250 may be located inside the body BD. The force transmitting member 250 may be adjacent to the body hole 223. An eject pin (not shown) passing through the SIM tray hole 221 and the body hole 223 may transmit a force to the force transmitting member 250. The force transmitting member (250) may be connected to the SIM housing (260). The force transmitting member 250 may move in the seam housing 260. The force transmitting member (250) may transmit a force to the stem housing (260). The force transmitting member 250 may be engaged with the discharge of the SIM tray 210. For example, as the force transmitting member 250 moves, the seaming housing 260 may eject at least a part of the SIM tray 210 from the body BD.

The body hole 223 may provide a space for connecting the inside and the outside of the mobile terminal 10 together with the SIM tray hole 221. Liquid or the like may flow into the inside of the mobile terminal 10 from the outside through the body hole 223. With the SIM tray 210 seated in the SIM housing 260, a component capable of shielding the body hole 223 may be considered.

The body hole 223 may form a tapered area TPA at one end adjacent to the body BD. When a component capable of shielding the body hole 223 is drawn into the body hole 223, the tapered area TPA is formed by inserting a component capable of shielding the body hole 223 into the body hole 223.

FIGS. 6 and 7 are views illustrating a waterproof unit according to an embodiment of the present invention. As shown in FIG. 6, the waterproof unit 300 according to an embodiment of the present invention may include a waterproof unit body 310, a first guide part 320, and a packing part 330. The waterproof unit 300 may shield the body hole 223 shown in FIG. 5. The waterproof unit 300 may shield the body hole 223 at one point of the body hole 223.

The waterproof unit body 310 may be located in the body hole 223 shown in FIG. 5. The waterproof unit body 310 may be located inside the body hole 223. The waterproof unit body 310 may move inside the body hole 223. The waterproof unit body 310 may move along the longitudinal direction of the body hole 223 within the body hole 223. The longitudinal direction of the body hole 223 may be substantially parallel to the moving direction of the SIM tray 210 shown in FIG. 4. At least a part of the waterproof unit body 310 may be located inside the body hole 223. At least a part of the waterproof unit body 310 may move within the body hole 223.

The waterproof unit body 310 may have a shape corresponding to the shape of the body hole 223. The cross section of the waterproof unit body 310 may correspond to the shape of the cross section of the body hole 223. The waterproof unit body 310 may have, for example, a cylinder shape. A part of the waterproof unit body 310 may have a concave shape in a direction toward the inside of the waterproof unit body 310.

The waterproof unit body 310 may form a virtual center line COA along the longitudinal direction of the waterproof unit body 310 as shown in FIG. 7. The center line COA may form an axis of the waterproof unit body 310 when the waterproof unit body 310 is in the shape of a cylinder.

The waterproof unit body 310 may form a hypothetical first virtual line VL1 parallel to the center line COA as shown in FIG. 7. The first guide part 320 may extend from one point of the first virtual line VL1.

The packing part 330 may be connected to the waterproof unit body 310. The packing part 330 may have a shape to enclose the waterproof unit body 310. The packing part 330 may wrap the circumference of the waterproof unit body 310 in an azimuthal direction with respect to the longitudinal direction of the waterproof unit body 310. The packing part 330 may be located in the concave region of the waterproof unit body 310.

The first guide part 320 may be connected to one side of the waterproof unit body 310. The first guide part 320 may extend from the waterproof unit body 310. The first guide part 320 may guide the movement of the waterproof unit body 310 inside the body hole 223. The first guide part 320 may include a guide connection part 321 and a guide bending part 323.

The guide connection part 321 may extend from the waterproof unit body 310. The guide connection part 321 may extend toward the longitudinal side of the waterproof unit body 310. For example, when the longitudinal direction of the waterproof unit body 310 is parallel to the X axis direction, the guide connection part 321 may extend from one side of the waterproof unit body 310 in parallel to the Y axis direction. The guide connection part 321 may connect the waterproof unit body 310 and the guide bending part 323.

The guide connecting part 321 may extend from one point of the first virtual line VL1. The guide connecting part 321 may form a virtual second virtual line VL2 parallel to the direction in which the guide connecting part 321 extends. The second virtual line VL2 may pass through the center of the guide connection part 321. The second virtual line VL2 may meet with the first virtual line VL1.

The guide connecting part 321 may form a flat surface with the waterproofing unit body 310. The plane formed by the waterproof unit body 310 and the guide connection part 321 is a virtual line parallel to the longitudinal direction of the waterproof unit body 310 and a virtual line parallel to the longitudinal direction of the waterproof unit body 310 line formed by the extended direction of the guide connection part 321. The plane formed by the waterproof unit body 310 and the guide connection part 321 may be a plane formed by the first virtual line VL1 and the second virtual line VL2. For example, the plane formed by the waterproof unit body 310 and the guide connection part 321 may be parallel to the XY plane.

The guide bending part 323 may be formed extending from the guide connecting part 321. The guide bending part 323 may be bent at the guide connecting part 321. The guide bending part 323 may form an angle with the guide connection section 321.

The guide bending part 323 may extend from the guide connection section 321 in a direction not parallel to the longitudinal direction of the waterproof unit body 310. For example, the guide bending part 323 may extend from the guide connection part 321 in a direction perpendicular to the longitudinal direction of the waterproof unit body 310.

The guide bending part 323 may extend from the guide connecting part 321 in a direction not parallel to the longitudinal direction of the guide connecting part 321. For example, the guide bending part 323 may extend from the guide connecting part 321 in a direction perpendicular to the longitudinal direction of the guide connecting part 321. The longitudinal direction of the guide connection part 321 may be a direction in which the guide connection part 321 extends from the waterproof unit body 310.

The guide bending part 323 may extend from the guide connection section 321 in a direction not parallel to the plane formed by the waterproof unit body 310 and the guide connection section 321. For example, the guide bending part 323 may extend from the guide connection section 321 in a direction perpendicular to the plane formed by the waterproof unit body 310 and the guide connection section 321.

The guide bending part 323 may be formed extending from one point of the second virtual line VL2. The guide bending part 323 may form a virtual third virtual line VL3 parallel to the direction in which the guide bending part 323 extends. The third virtual line VL3 may pass through the center of the guide bend 323. And the third virtual line VL3 may meet with the second virtual line VL2.

The guide bending part 323 may form a plane with the guide connection part 321. The plane formed by the guide bending part 323 and the guide connection part 321 is a virtual line parallel to the extending direction of the guide connection part 321 and a virtual line parallel to the extending direction of the guide connection part 321 the plane formed by the guide connecting part 321 and the guide bending part 323 may be a plane formed by the second virtual line VL2, and a plane formed by the third virtual line VL3. For example, the plane formed by the guide bending part 323 and the guide connecting part 321 may be parallel to the YZ plane.

The plane formed by the guide bending part 323 and the guide connection part 321 may not be parallel to the plane formed by the guide connection part 321 and the waterproof unit body 310. The plane formed by the guide bending part 323 and the guide connection part 321 may be perpendicular to the plane formed by the guide connection part 321 and the waterproof unit body 310.

The guide bending part 323 may form a plurality of surfaces. For example, the surface formed in the guide bending part 323 may have a first guide bend plane GBSF1, a second guide bend plane GBSF2, a third guide bend plane GBSF3, (GBSF4). At least one of the first to fourth guide folded surfaces GBSF1, GBSF2, GBSF3, and GBSF4 formed on the guide bending part 323 may be related to a second guide part to be described later.

The first guide bent surface GBSF1 may be adjacent to the guide connecting part 321. The first guide folded surface GBSF1 may be directed to the waterproof unit body 310. The first guide curved surface GBSF1 may include a part of a plane and/or a part of a curved surface. The first guide folded surface GBSF1 may be parallel to the longitudinal direction of the waterproof unit body 310. The first guide bend plane GBSF1 may be parallel to the first imaginary line VL1. The first guide folded surface GBSF1 may be parallel to the third virtual line VL3.

The second guide folded surface GBSF2 may extend from the first guide folded surface GBSF1 and may be bent. The second guide curved surface GBSF2 may include a part of a plane and/or a part of a curved surface. The second guide bent surface GBSF2 may be parallel to the longitudinal direction of the waterproof unit body 310. The second guide bent surface GBSF2 may be parallel to the first imaginary line VL1. The second guide bent surface GBSF2 may be aligned with the extending direction of the guide extending part 321. The second guide bent surface GBSF2 may be parallel to the second virtual line VL2. The second guide folded surface GBSF2 may not be parallel to the extending direction of the guide bent part 323. For example, the second guide bend plane GBSF2 may be perpendicular to the third imaginary line VL3.

The second guide folded surface GBSF2 may form an angle with the first guide folded surface GBSF1. The angle formed by the second guide curved surface GBSF2 with the first guide curved surface GBSF1 may be a right angle, for example, as shown in FIG. 7. The second guide bent surface GBSF2 may be formed integrally with the first guide bent surface GBSF1. For example, the angle formed by the second guide bent surface GBSF2 and the first guide bent surface GBSF1 may be 180 degrees.

The third guide folded surface GBSF3 may extend from the second guide folded surface GBSF2 and may be bent. The third guide folded surface GBSF3 may include a part of a plane and/or a part of a curved surface. The third guide folded surface GBSF3 may be aligned with the first guide folded surface GBSF1. The third guide folded surface GBSF3 may be directed in a direction opposite to the direction in which the first guide folded surface GBSF1 is oriented. The third guide folded surface GBSF3 may be directed in a direction in which the guide connecting part 321 extends from the waterproof unit body 310. For example, the third guide bent surface GBSF3 may be oriented in the direction in which the second virtual line VL2 faces.

The third guide folded surface GBSF3 may form an angle with the second guide folded surface GBSF2. The angle formed by the third guide bent surface GBSF3 and the second guide bent surface GBSF2 may be a right angle, for example, as shown in FIG. 7. The third guide folded surface GBSF3 may be formed integrally with the second guide folded surface GBSF2. For example, the third guide folded surface GBSF3 may be formed at an angle of 180 degrees with the second guide folded surface GBSF2.

The fourth guide folded surface GBSF4 may extend from the third guide folded surface GBSF3 and may be bent. The fourth guide folded surface GBSF4 may comprise a part of a plane and/or a part of a curved surface. The fourth guide folded surface GBSF4 may be aligned with the second guide folded surface GBSF2. The fourth guide folded surface GBSF4 may be parallel to the longitudinal direction of the waterproof unit body 310. The fourth guide bent surface GBSF4 may be parallel to the first imaginary line VL1.

The fourth guide folded surface GBSF4 may form an angle with the third guide folded surface GBSF3. The angle formed by the fourth guide bent surface GBSF4 with the third guide bent surface GBSF3 may be a right angle, for example, as shown in FIG. 7.

FIGS. 8 and 9 are cross-sectional views of the waterproof unit of FIG. 6 taken along line C-C'. C-C' may be parallel to the longitudinal direction of the waterproof unit body 310. FIG. 8 is a cross-sectional view of the waterproof unit 300 in a state where the packing part 330 is removed. When the waterproof unit 300 of FIG. 6 is taken along the line C-C' and the packing unit 330 is excluded, a cross section of the waterproof unit body 310 may appear.

The waterproof unit body 310 may have a cylinder shape. The waterproof unit body 310 shown in FIG. 8 may include a virtual center line (COA). The center line COA may form an axis of the waterproof unit body 310.

The waterproof unit body 310 may form a concave part RCS on one side. The concave part RCS may have a concave shape as compared with the main surface of the concave part RCS. The concave part RCS may provide a space in which the packing part 330 is fitted. The diameter of the waterproof unit body 310 in the concave part RCS may be the first waterproof unit body diameter WPD1. The first waterproof unit body diameter WPD1 may mean the average diameter of the concave part RCS.

The outer diameter of the waterproof unit body 310 may be the second waterproof unit body diameter WPD2. The second waterproof unit body diameter WPD2 may mean an average diameter of the waterproof unit body 310 excluding the concave part RCS. The second waterproof unit body diameter WPD2 may be larger than the first waterproof unit body diameter WPD1.

FIG. 9 is a view illustrating a state in which the packing part 330 is fitted in the concave part RCS of the waterproofing unit body 310 of FIG. 8. The packing part 330 may be fitted in the concave part RCS of the waterproof unit body 310 as shown in FIG. 9.

The packing part 330 may include a packing part body 331 and a packing part ring 333. The packing part body 331 may be fitted in the concave part RCS of the waterproof unit body 310. The packing ring 333 may extend from the surface of the packing body 331 toward the outside of the packing 330. The outer diameter of the packing part 330 may be the third packing part diameter PMD3. The third packing part diameter PMD3 may be the diameter of the packing part 300 inserted into the body hole 223. The packing part 330 may include a stretchable material. When the packing part 330 is inserted into the body hole 223, the third packing part diameter PMD3 may be changed corresponding to the diameter of the body hole 223.

FIG. 10 is a cross-sectional view of the waterproof unit of FIG. 6 taken along the line D-D'. D-D' may be aligned with the extending direction of the guide connecting part 321. The cross section of the waterproofing unit 300 shown in FIG. 10 may be the shape of the waterproofing unit 300 seen from the direction of movement of the waterproofing unit 300.

The second guide part (described later) for guiding the waterproof unit 300 may have a shape corresponding to the shape of the end face of the first guide part 320 shown in FIG. 10. For example, the second guide part may form a surface that faces at least three of the first to fourth guide folded surfaces GBSF1, GBSF2, GBSF3, and GBSF4 formed on the guide bend part 323. For example, the second guide part may form a surface opposing at least two of the first to fourth guide folded surfaces GBSF1, GBSF2, GBS3, and GBSF4 formed on the guide bend part 323.

FIG. 11 is a view illustrating a packing part of the waterproof unit of FIG. 6. FIG. 11 is a perspective view of the packing part 330. The center line COA may form an axis of the packing part 330. The packing part 330 may include a stretchable material. The packing part 330 may include a polymer material. The packing part 330 may include a rubber material. The packing part 330 may include a silicon material. The packing part 330 may include a polyurethane material. The packing part 330 may include a thermoplastic urethane material. The diameters of the first to third packing parts PMD1, 2, and 3 shown in FIG. 11 may represent values in a state in which the packing part 330 is not connected to the packing part body 331.

The packing part body 331 may have a hollow part formed therein. The hollow part formed in the packing part body 331 may provide a space in which the waterproof unit body 310 is fitted. The hollow part of the packing part body 331 may form the first packing part diameter PMD1. The first packing part diameter PMD1 may correspond to the first waterproofing unit body diameter WPD1. For example, the first packing part diameter PMD1 may be equal to or smaller than the first waterproofing unit body diameter WPD1. The outer diameter of the packing part body 331 may be the second packing part diameter PMD2. The second packing part diameter PMD2 may be larger than the first packing part diameter PMD1. The second packing part diameter PMD2 may be smaller than the second waterproofing unit body diameter WPD2.

The packing ring 333 may be formed along the outer periphery of the packing body 331. The packing part ring 333 may be in contact with the body hole 223 when the packing part 330 enters the body hole 223. The outer diameter of the packing ring 333 may be the third packing part diameter PMD3. The third packing part diameter PMD3 may be larger than the inner diameter of the body hole 223. The outer diameter of the packing ring 333 may be the same or smaller than the third packing part diameter PMD3 shown in FIG. 11 when the packing part 330 is located inside the body hole 223.

FIG. 12 is a view illustrating a state in which a waterproof unit is included in the mobile terminal of FIG. 5. As shown in FIG. 12, at least a part of the waterproof unit 300 may be located inside the body hole 223.

The waterproof unit 300 shown in FIG. 12 may shield the body hole 223 at one point of the body hole 223. The one point at which the waterproof unit 300 shields the body hole 223 may be a point where the packing part 330 contacts the body hole 223. The point at which the waterproofing unit 300 shields the body hole 223 may be a plurality of points. The point where the waterproofing unit 300 shields the body hole 223 may be a certain section of the body hole 223.

At least a part of the waterproof unit 300 may move inside the body hole 223. The waterproof unit 300 may move along the direction of opening of the body hole 223. At least a part of the waterproof unit body 310 may move within the body hole 223.

One end of the waterproof unit body 310 may face the card tray hole 221. The other end of the waterproof unit body 310 may face the force transmitting member 250. The direction from the one end of the waterproof unit body 310 toward the other end may be parallel to the longitudinal direction of the waterproof unit body 310.

A pressure or force may be applied to the one end of the waterproof unit body 310 from the discharge pin EJP. The arrow adjacent to the discharge pin EJP in FIG. 12 may indicate the direction of the force or the direction of the force that the discharge pin EJP provides to the waterproof unit 300.

When the waterproof unit body 310 is provided with a force or pressure, the waterproof unit 300 may move along the opened direction of the body hole 223. The opening direction of the body hole 223 may be the longitudinal direction of the body hole 223. The body hole 223 may contribute to guide the waterproof unit 300 when the waterproof unit 300 moves. The direction in which the body hole 223 guides the waterproof unit 300 may be the longitudinal direction of the body hole 223. When the packing part 330 contacts the inside of the body hole 223 uniformly, a waterproof effect may be expected. The waterproof unit body 310 may evenly contact the inside of the body hole 223 with the packing part 330 when the waterproof unit body 310 is maintained at a predetermined interval in the body hole 223. It is conceivable that the waterproof unit body 310 is guided to move within the body hole 223 at a constant interval.

The force or pressure provided to the waterproof unit body 310 may be transmitted to the force transmitting member 250. The arrows adjacent to the force transmitting member 250 in FIG. 12 may indicate the direction of the force or the direction of the force that the waterproofing unit 300 provides to the force transmitting member 250.

The hollow part formed inside the body hole 223 may be in the form of a cylinder. The waterproof unit 300 may rotate in azimuth direction with respect to the longitudinal direction of the body hole 223 when the waterproof unit 300 moves. When the waterproof unit 300 rotates in the azimuth direction with respect to the longitudinal direction of the body hole 223, twisting may occur in the packing part 330. When the packing part 330 is twisted, the packing part 330 may be damaged. A configuration for preventing the rotation of the waterproof unit 300 in the azimuth direction with respect to the longitudinal direction of the body hole 223 may be considered.

FIGS. 13 to 16 are views illustrating a second guide unit according to an embodiment of the present invention. A structure for guiding the waterproof unit body 310 to move at a predetermined interval within the body hole 223 and a structure for preventing the waterproof unit 300 from rotating in the azimuth direction with respect to the longitudinal direction of the body hole 223, the first guide part 320 and the second guide part 400 may be considered.

FIG. 13 is a perspective view of the second guide part 400. The second guide part 400 may be located inside the body BD. The second guide part 400 may be formed corresponding to the shape of the first guide part 320. The second guide unit 400 may be installed inside the body BD so as to be spaced apart from the waterproof unit body 310. The second guide part 400 may be spaced apart from the body hole 223.

The second guide part 400 may include a plurality of guide walls for guiding the first guide part 320. For example, the second guide unit 400 may include a first guide wall 410, a second guide wall 420, a third guide wall 430, and a fourth guide wall 440. At least three guide walls among the first to fourth guide walls 410, 420, 430 and 440 may guide the waterproof unit 300 by surrounding the first guide 320. The second guide unit 400 may include a stopper wall 450 connecting the second guide wall 420 and the fourth guide wall 440.

The first guide wall 410 may be formed to extend in the direction in which the body hole 223 is opened. The first guide wall 410 may extend in the longitudinal direction of the waterproof unit body 310. The first guide wall 410 may face the guide bending part 323. The first guide wall 410 may be shorter in the longitudinal direction of the waterproof unit body 310 than the second to fourth guide walls 420, 430, and 440.

The second guide wall 420 may extend from the first guide wall 410 and be curved. The second guide wall 420 may extend in the longitudinal direction of the waterproof unit body 310.

The third guide wall 430 may extend from the second guide wall 420 and be curved. The third guide wall 430 may extend in the longitudinal direction of the waterproof unit body 310. The third guide wall 430 may be spaced apart from the first guide wall 410.

The fourth guide wall 440 may be connected to the third guide wall 430. The fourth guide wall 440 may be constructed using a part of the body BD. The fourth guide wall 440 may be spaced apart from the second guide wall 420.

FIG. 14 is a sectional view of the second guide part taken along line E-E' in FIG. 13; Fig. As shown in FIG. 14, the second guide unit 400 may include first to fourth guide walls 410, 420, 430, and 440. The second guide part 400 may include a surface facing the first guide part 320.

The second guide part 400 may include first to fourth guide wall surfaces GWSF1, GWSF2, GWSF3, and GWSF4 formed on the inner side of the second guide part 400. The first to fourth guide wall surfaces GWSF1, GWSF2, GWSF3, and GWSF4 may be directed to the first guide part 320. The first to fourth guide wall surfaces GWSF1, GWSF2, GWSF3 and GWSF4 may form a space for guiding the first guide part 320. The first to fourth guide wall surfaces GWSF1, GWSF2, GWSF3, and GWSF4 may be configured to surround the guide bend part 323.

FIG. 15 is a sectional view of the second guide part taken along the line F-F' in FIG. 13. The second guide unit 400 may include first to third guide walls 410, 420, and 430 at one point in the longitudinal direction of the second guide unit 400. The longitudinal direction of the second guide part 400 may be parallel to the longitudinal direction of the waterproof unit body 310.

Unlike the second guide unit 400 shown in FIG. 14, the second guide unit 400 may not include the first guide wall 410 at one point in the longitudinal direction such that a space for moving the force transmitting member 250 may be secured.

The second guide part 400 may form second to fourth guide wall surfaces GWSF2, GWSF3, and GWSF4 as shown in FIG. 15. The second to fourth guide wall surfaces GWSF2, GWSF3 and GWSF4 may face the first guide part 320. The second to fourth guide wall surfaces GWSF2, GWSF3 and GWSF4 may form a space in which the first guide part 320 is guided.

FIG. 16 is a sectional view of the second guide part taken along the line G-G' in FIG. 13. G-G' may indicate the direction in which the first guide part 320 is directed from the inside of the body BD to the outside of the body BD. The second guide part 400 may include second and fourth guide walls 420 and 440. The second guide unit 400 may include a stopper wall 450 connecting the second guide wall 420 and the fourth guide wall 440.

The stopper wall 450 may be positioned at one end of the second guide wall 420 and the fourth guide wall 440. The stopper wall 450 may be configured as a part of the body BD. The stopper wall 450 may prevent the first guide part 320 from being drawn out to the outside. The stopper wall 450 may restrict movement of the first guide part 320 in the direction in which the first guide part 320 is drawn out to the outside of the body BD.

FIG. 17 is a view illustrating a state where the second guide part is included in the mobile terminal of FIG. 12. FIG. 17 is a perspective view of the waterproof unit 300 and the second guide unit 400 viewed from the inside of the body BD.

The waterproofing unit 300 shown in FIG. 17 may be in a state in which the body hole 223 is shielded while the SIM tray 210 is drawn into the body BD. The waterproof unit 300 may be in a state of being subjected to a force or pressure from the force transmitting member 250 in the direction from the inside to the outside of the body BD.

At least a part of the first guide part 320 of the waterproof unit 300 may be surrounded by the second guide part 400. The waterproof unit 300 may be stably positioned by the second guide unit 400.

FIG. 18 is a cross-sectional view of the waterproofing unit 300 and the second guide part of FIG. 17 cut along the line H-H'. FIG. 18 shows the relationship between the waterproof unit 300 and the second guide unit 400 when the waterproof unit 300 shields the body hole 223. FIG. 18 shows the relationship between the waterproof unit 300 and the second guide unit 400 in a state in which the SIM tray 210 is drawn into the body BD.

The second guide part 400 may cover at least a part of the first guide part 320 as shown in FIG. 18. The first to fourth guide walls 410, 420, 430 and 440 may guide the guide bend part 323 to guide the guide bend part 323.

The second guide part 400 may form the first to fourth guide wall surfaces GWSF1, GWSF2, GWSF3, and GWSF4. The first to fourth guide wall surfaces GWSF1, GWSF2, GWSF3, and GWSF4 may face the first to fourth guide curved surfaces GBSF1, GBSF2, GBSF3, and GBSF4, respectively.

When the waterproof unit body 310 is in the shape of a cylinder, the waterproof unit body 310 may form a virtual center line COA therein. The centerline COA may be the center axis of the waterproof unit body 310. When the waterproof unit body 310 is in the form of a column, the center line COA may be a line of center of mass.

It is possible to consider a situation where the waterproofing unit 300 receives force or pressure in the azimuth direction of the longitudinal direction of the waterproof unit body 310 from the outside. A virtual line segment connecting the center line COA at the point where the second guide bent surface GBSF2 and the third guide bent surface GBSF3 meet may be referred to as a first torque line TL1. A virtual line segment connecting the center line COA at the point where the third guide bend plane GBSF3 and the fourth guide bend plane GBSF4 meet may be referred to as a second torque line TL2.

The first torque line TL1 and the second torque line TL2 are arranged such that the center line COA is formed at a point where the first guide part 320 meets the second guide part 400 when the waterproof unit body 310 rotates. For example, when the waterproof unit body 310 receives a force to rotate counterclockwise in FIG. 18 from the outside, the rotation of the waterproof unit body 310 at one end of the first torque line TL1 A force for restraining the first guide part 320 may be provided. For example, when the waterproof unit body 310 receives a force that rotates clockwise in FIG. 18 from the outside, rotation of the waterproof unit body 310 at one end of the second torque line TL2 is suppressed Force may be provided to the first guide part 320. The first and second torque lines TL1 and TL2 may vary depending on the shapes of the first guide part 320 and/or the second guide part 320.

The second guide part 400 may be spaced apart from the waterproof unit body 310. The extent to which the second guide part 400 is spaced apart from the waterproof unit body 310 may correspond to the length of the guide connection part 321. The length of the first and second torque lines TL1 and TL2 may correspond to the length of the guide connection part 321.

The second guide curved surface GBSF2 and the second guide wall surface GWSF2 may face each other and have a clearance. When the force or pressure for rotating the waterproof unit body 310 in the counterclockwise direction in FIG. 18 is provided from the outside, the second guide bending plane GBSF2 may receive the force in the direction of the arrow. The second guide wall GWSF2 may prevent the movement of the second guide wall GBSF2 when the second guide wall GBSF2 receives a force in the direction of the upward arrow.

The clearance between the second guide curved surface GBSF2 and the second guide wall surface GWSF2 may be reduced by the force or pressure between the second guide curved surface GBSF2 and the second guide wall surface GWSF2. In other words, a difference in clearance may occur between the first guide part 320 and the second guide part 400 due to a rotational force applied to the waterproof unit 300 from the outside.

The clearance difference between the first guide part 320 and the second guide part 400 may cause rotation of the waterproof unit body 310. The amount of rotation of the waterproof unit body 310 caused by the clearance difference between the first guide part 320 and the second guide part 400 is set to be shorter than the length of the first and second torque lines TL1 and TL2 (Negative correlation). The amount of rotation of the waterproof unit body 310 generated by the clearance difference between the first guide part 320 and the second guide part 400 is set to be larger than the amount of rotation of the first and second torque lines TL1 and TL2) Of the first and second frames. The smaller the amount of rotation of the waterproof unit body 310, the smaller the torsion applied to the packing part 330 may be. As the amount of rotation of the waterproof unit body 310 is smaller, the damage of the packing part 330 may be reduced.

The length of the first and second torque lines TL1 and TL2 may correspond to the length of the guide connecting part 321 in the extended direction. The length of the guide connecting part 321 in the extended direction may correspond to the degree to which the second guide part 400 is spaced apart from the waterproof unit body 310 and/or the body hole 223. The guide connecting part 321 may contribute to a reduction in the amount of rotation of the waterproof unit body 310. The arrangement of the second guide part 400 installed to be spaced apart from the waterproof unit body 310 and/or the body hole 223 may contribute to a reduction in the amount of rotation of the waterproof unit body 310.

FIG. 19 is a cross-sectional view taken along line B-B' in a state where the waterproof unit and the second guide part are installed on the mobile terminal of FIG. 1. In FIG. 19, the second guide wall 420 is cut away and not shown.

The force transmitting member 250 may be provided with a force in one direction from the deep housing 260. The force transmitting member 250 may provide the waterproofing unit 300 with a pushing force or pressure in the direction of the arrow shown in FIG. 19.

The stopper wall 450 of the second guide part 400 may prevent the waterproofing unit 300 from moving in the direction toward the outside of the body BD as shown in FIG. 19. In the absence of the stopper wall 450, the waterproofing unit 300 may provide the pushing force or pressure to the SIM tray 210 in the direction toward the outside of the body BD. The area of the center tray hole 221 of the area of the SIM tray 210 may protrude outward when the SIM tray 210 is subjected to a force or pressure in the direction toward the outside of the body BD. The stopper wall 450 may contribute to the stable placement of the SIM tray 210.

FIG. 20 is a view illustrating a state in which the waterproof unit is moved in the mobile terminal of FIG. 12. When the discharge pin EJP shown in FIG. 12 applies a force or pressure to the waterproof unit 300 in the direction toward the inside of the body BD, the waterproof unit 300 applies force or pressure to the force transfer member 250.

The waterproof unit 300 may move along the body hole 223 by a force or a pressure provided from the discharge pin EJP. The waterproof unit 300 may be guided by the second guide unit 400 when moving along the body hole 223.

The waterproofing unit 300 moves and may transmit a force or a pressure to the force transmitting member 250. The force transmitting member 250 may move in the inward direction of the body BD by the waterproof unit 300. The force or pressure that the discharge pin EJP provides to the waterproof unit 300 may be larger than the force or pressure that the force transmitting member 250 provides to the waterproof unit 300.

When the force transmitting member 250 moves and changes a component of the SIM housing 260, the SIM housing 260 may discharge the SIM tray 210 to the outside of the body BD. The force or pressure that the force transmitting member 250 provides to the waterproofing unit 300 may be interrupted when a change is made to the one component of the SIM housing 260.

FIG. 21 is a view showing a state where the second guide part is included in the mobile terminal of FIG. 20. FIG. 21 is a perspective view of the waterproof unit 300 and the second guide unit 400 viewed from inside the body BD.

The waterproofing unit 300 shown in FIG. 21 may be in a state in which the body hole 223 is opened in a state in which at least a part of the SIM tray 210 is drawn out to the outside of the body BD. The waterproofing unit 300 shown in FIG. 21 may have no force provided from the force transmitting member 250.

At least a part of the first guide part 320 may be wrapped by the second guide part 400. The first guide part 320 may be guided by the second guide part 400 when the waterproofing unit body 310 moves along the body hole 223.

FIG. 22 is a cross-sectional view of the waterproof unit 300 and the second guide unit of FIG. 21 taken along I-I'. FIG. 22 shows the relationship between the waterproof unit 300 and the second guide unit 400 when the waterproof unit 300 opens the body hole 223. FIG. 22 shows the relationship between the waterproof unit 300 and the second guide unit 400 in a state in which at least a part of the SIM tray 210 is drawn out from the body BD.

The second guide part 400 may cover at least a part of the first guide part 320 as shown in FIG. The second to fourth guide walls 420, 430, and 440 may guide at least a part of the guide bend part 323 and guide the guide bend part 323.

The second guide part 400 may form second to fourth guide wall surfaces GWSF2, GWSF3, and GWSF4. The second to fourth guide wall surfaces GWSF2, GWSF3, and GWSF4 may face the second to fourth guide curved surfaces GBSF2, GBSF3, and GBSF4, respectively. The contents related to the first and second torque lines TL1 and TL2 are as described above.

FIG. 23 is a view illustrating a state in which the SIM tray is discharged from the mobile terminal of FIG. 19. As show in FIG. 23, when at least a part of the force transmitting member 250 is drawn into the inside of the SIM housing 260, at least a part of the SIM tray 210 may be drawn out of the body BD.

As show in FIG. 23, when at least a part of the SIM tray 210 is drawn out of the body BD, the SIM card SMC loaded on the SIM tray 210 may be exposed to the outside. The SIM card (SMC) exposed to the outside may be replaced or/and exchanged.

When at least a part of the SIM tray 210 is exposed to the outside of the body BD, liquid or the like may penetrate into the space where the SIM tray 210 is discharged outside the area of the body hole 223. It may not be necessary to waterproof the body hole 223 when at least a part of the SIM tray 210 is exposed to the outside of the body BD. The waterproof unit 300 may open the body hole 223 when at least a part of the SIM tray 210 is exposed to the outside of the body BD. The waterproof unit 300 may be regarded as opening the body hole 223 when the packing part 330 of the waterproof unit 300 is out of the body hole 223. 'Opening of the body hole 223' may mean that liquid may penetrate through the body hole 223 from the outside of the body BD to the inside.

The foregoing embodiments are merely and are not to be considered as limiting the present invention. The present teachings may be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

The invention claimed is:
1. A mobile terminal, comprising:
a body having a body hole;
a display unit disposed on a front surface of the body;
a waterproof unit including:
a waterproof unit body which is located inside the body and is movable,
a first guide part connected to the waterproofing unit body, and
a packing part connected to the waterproofing unit body,
wherein the water proof unit shields the body hole at one point of the body hole by contacting the inside of the body hole with the packing part,
a second guide part formed corresponding to the first guide part and spaced apart from the waterproof unit body to be installed inside the body and guiding the first guide part.

2. The mobile terminal of claim 1, wherein the first guide part comprises,
a guide connection part formed extending from the waterproof unit body; and
a guide bending part formed extending from the guide connection part and bent at least partially by the second guide part.

3. The mobile terminal of claim 2, wherein the second guide part comprises a plurality of guide walls facing the guide bending part.

4. The mobile terminal of claim 2, wherein the second guide part comprises a stopper wall for inhibiting movement in one direction at one point of the first guide part.

5. The mobile terminal of claim 2, wherein the second guide part includes a first guide wall and a third guide wall separated apart from the first guide wall,
wherein the guide bending part is guided and positioned between the first guide wall and the third guide wall at one point.

6. The mobile terminal of claim 5,
wherein the first guide wall forms a first guide wall surface facing the guide bend part,
wherein the third guide wall forms a third guide wall surface facing the guide bend part,
wherein the first and third guide wall surfaces are separated apart from the waterproof unit body 310.

7. The mobile terminal of claim 6, wherein the second guide part includes a second guide wall and a fourth guide wall located between the first guide wall and the third guide wall,
wherein the guide bend part is guided and positioned between the second guide wall and the fourth guide wall at one point.

8. The mobile terminal of claim 5, wherein the second guide part includes a second guide wall and a fourth guide wall located between the first guide wall and the third guide wall,
wherein the guide bend part is guided and positioned between the second guide wall and the fourth guide wall at one point.

9. The mobile terminal of claims 1, wherein at least part of the waterproof unit body is movable in parallel with an opening direction of the body hole within the body hole.

10. The mobile terminal of claims 1, wherein the waterproof unit body has a columnar shape and is recessed toward one side of the longitudinal direction of the waterproof unit body to form a concavity for seating the packing part.

11. The mobile terminal of claim 1, wherein the packing part comprises a packing body located in the concave part and coupled to the waterproofing unit body.

12. The mobile terminal of claim 11, wherein the packing part includes a packing ring located on an outer circumferential surface of the waterproof unit body and in contact with an inner surface of the body hole when the waterproof unit body is located at one point of the body hole.

13. The mobile terminal of claim 1, further comprising a force transmitting member located in the body and being provided with a force from the waterproof unit.

14. The mobile terminal of claim 13, wherein the force transmitting member provides an elastic force to the waterproof unit.

* * * * *